United States Patent
Petermann et al.

(10) Patent No.: US 11,946,198 B2
(45) Date of Patent: Apr. 2, 2024

(54) DISPERSE AZO DYES, A PROCESS FOR THE PREPARATION THEREOF AND THE USE THEREOF

(71) Applicant: Huntsman Advanced Materials Licensing (Switzerland) GMBH, Basel (CH)

(72) Inventors: Ralf Petermann, Basel (CH); Urs Lauk, Munich (DE); Kevin Murer, Ettingen (CH); Simon Pfister, Aesch (CH); Yvonne Pesek, Röschenz (CH)

(73) Assignee: Huntsman Textile Effects (Switzerland) GmbH, Base (CH)

( * ) Notice: Subject to any disclaimer, the term of this patent is extended or adjusted under 35 U.S.C. 154(b) by 89 days.

(21) Appl. No.: 17/792,982

(22) PCT Filed: Jan. 13, 2021

(86) PCT No.: PCT/EP2021/050578
§ 371 (c)(1),
(2) Date: Jul. 14, 2022

(87) PCT Pub. No.: WO2021/144304
PCT Pub. Date: Jul. 22, 2021

(65) Prior Publication Data
US 2023/0082859 A1    Mar. 16, 2023

(30) Foreign Application Priority Data
Jan. 15, 2020    (EP) .................................... 20152015

(51) Int. Cl.
C09B 29/00    (2006.01)
C09B 29/01    (2006.01)
(Continued)

(52) U.S. Cl.
CPC ............ D06P 1/18 (2013.01); C09B 29/0007 (2013.01); C09B 29/0051 (2013.01);
(Continued)

(58) Field of Classification Search
CPC ...... D06P 1/18; D06P 1/19; D06P 1/20; D06P 3/54; D06P 5/30; C09B 29/0007;
(Continued)

(56) References Cited

FOREIGN PATENT DOCUMENTS

GB    1418742 A  * 12/1975  ........... C07D 239/48

OTHER PUBLICATIONS

STIC Search Report dated Nov. 28, 2023.*

* cited by examiner

Primary Examiner — Eisa B Elhilo
(74) Attorney, Agent, or Firm — Christensen, Fonder, Dardi & Herbert, PLLC; Peter S. Dardi

(57) ABSTRACT

The present invention relates to azo dyes of formula (1), wherein D is a radical of formula (2) or (3), $R_1$ and $R_2$ independently denote hydrogen; $C_6$-$C_{10}$ aryl which is unsubstituted or substituted by cyano, carboxy, hydroxy, halogen, $C_1$-$C_6$alkyl, or $C_1$-$C_6$alkoxy; $C_1$-$C_{12}$alkyl which may be interrupted one or more times by —O—, —S—, —$NR_4$—, —CO—, —COO— or —OOC—, and is unsubstituted or substituted by cyano, carboxy, hydroxy, $C_6$-$C_{10}$ aryl, or $C_6$-$C_{10}$ aryloxy, which $C_6$-$C_{10}$ aryl or $C_6$-$C_{10}$ aryloxy is unsubstituted or substituted by cyano, carboxy, hydroxy, halogen, $C_1$-$C_6$alkyl, or $C_1$-$C_6$alkoxy; $R_3$ and $R_4$ are each independently of the other hydrogen, halogen, nitro, cyano, trifluoromethyl, carboxy, $C_1$-$C_6$alkyl, $C_1$-$C_6$alkoxy, $C_1$-$C_6$alkylcarbonyl, $C_6$-$C_{10}$ arylcarbonyl, $C_1$-$C_6$alkoxycarbonyl, $C_1$-$C_6$alkylsulfonyl, $C_1$-$C_6$alkylsulfonylamino or $C_1$-$C_4$ alkanoylamino; and $R_5$ is halogen, nitro, cyano, trifluoromethyl, carboxy, $C_1$-$C_6$alkyl, $C_1$-$C_6$alkoxy, $C_1$-$C_6$alkylcarbonyl, $C_6$-$C_{10}$ arylcarbonyl, $C_1$-$C_6$alkoxycarbonyl, $C_1$-$C_6$alkylsulfonyl, $C_1$-$C_6$alkylsulfonylamino or $C_1$-$C_4$ alkanoylamino; and $R_6$, $R_7$, $R_8$ and $R_9$ independently of each other are hydrogen, hydroxy, halogen, cyano, nitro or $C_1$-$C_4$ alkanoylamino, and the radicals X independently denote N or C—H, with the proviso that at least one radical X denotes C—H, which are distinguished by their good lightfastness properties.

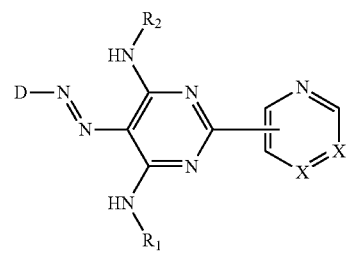

(1)

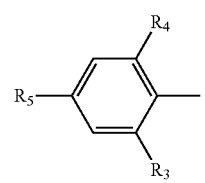

(2)

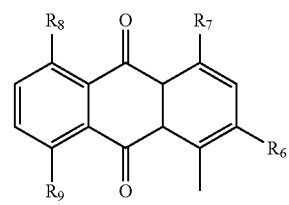

(3)

14 Claims, No Drawings

(51) Int. Cl.
    *C09B 29/036*     (2006.01)
    *C09B 56/12*     (2006.01)
    *C09B 67/38*     (2006.01)
    *D06P 1/18*     (2006.01)
    *D06P 1/19*     (2006.01)
    *D06P 1/20*     (2006.01)
    *D06P 3/54*     (2006.01)

(52) U.S. Cl.
    CPC ............ *C09B 56/12* (2013.01); *C09B 67/008* (2013.01); *D06P 1/19* (2013.01); *D06P 1/20* (2013.01); *D06P 3/54* (2013.01)

(58) Field of Classification Search
    CPC ... C09B 29/0051; C09B 56/12; C09B 67/008; C09B 29/0003; C09B 29/0022
    USPC .......................................................... 8/437
    See application file for complete search history.

DISPERSE AZO DYES, A PROCESS FOR THE PREPARATION THEREOF AND THE USE THEREOF

This application is the National Phase of International Application PCT/EP2021/050578 filed Jan. 13, 2021 which designated the U.S. and which claims priority to EP 20152015.2, filed Jan. 15, 2012. The noted applications are incorporated herein by reference.

The present invention relates to new diamino pyrimidine disperse azo dyes, a process for the preparation of such dyes and to the use thereof in dyeing or printing semi-synthetic and especially synthetic hydrophobic fibre materials, more especially textile materials.

Diamino pyrimidine disperse azo dyes are known, for example, from GB Patent No. 1 418 742. However, it has been found that the dyeings or prints obtained using the currently known dyes do not in all cases satisfy today's requirements, especially in respect of light fastness. There is therefore a need for new dyes that especially have good light fastness properties.

Surprisingly, we found that diamino pyrimidine disperse azo dyes substituted with a nitrogen containing heterocyclic aromatic ring fulfill the requirements described above and show very good light fastness, especially hot light fastness.

The present invention relates to azo dyes of formula

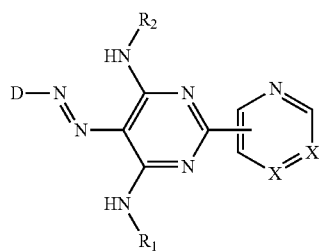

(1)

wherein
D is a radical of formula

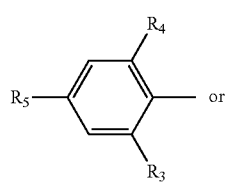

or

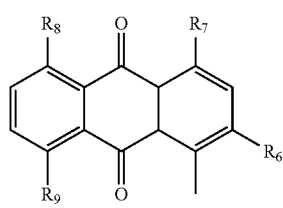

(2)

(3)

$R_1$ and $R_2$ independently denote hydrogen; $C_6$-$C_{10}$ aryl which is unsubstituted or substituted by cyano, carboxy, hydroxy, halogen, $C_1$-$C_6$alkyl, or $C_1$-$C_6$alkoxy; $C_1$-$C_{12}$alkyl which may be interrupted one or more times by —O—, —S—, —NR$_4$—, —CO—, —COO— or —OOC—, and is unsubstituted or substituted by cyano, carboxy, hydroxy, $C_6$-$C_{10}$ aryl, or $C_6$-$C_{10}$ aryloxy, which $C_6$-$C_{10}$ aryl or $C_6$-$C_{10}$ aryloxy is unsubstituted or substituted by cyano, carboxy, hydroxy, halogen, $C_1$-$C_6$alkyl, or $C_1$-$C_6$alkoxy;

$R_3$ and $R_4$ are each independently of the other hydrogen, halogen, nitro, cyano, trifluoromethyl, carboxy, $C_1$-$C_6$ alkyl, $C_1$-$C_6$alkoxy, $C_1$-$C_6$alkylcarbonyl, $C_6$-$C_{10}$ arylcarbonyl, $C_1$-$C_6$alkoxycarbonyl, $C_1$-$C_6$alkylsulfonyl, $C_1$-$C_6$alkylsulfonylamino or $C_1$-$C_4$ alkanoylamino; and $R_5$ is halogen, nitro, cyano, trifluoromethyl, carboxy, $C_1$-$C_6$alkyl, $C_1$-$C_6$ alkoxy, $C_1$-$C_6$alkylcarbonyl, $C_6$-$C_{10}$ arylcarbonyl, $C_1$-$C_6$alkoxycarbonyl, $C_1$-$C_6$alkylsulfonyl, $C_1$-$C_6$alkylsulfonylamino or $C_1$-$C_4$ alkanoylamino; and $R_6$, $R_7$, $R_8$ and $R_9$ independently of each other are hydrogen, hydroxy, halogen, cyano, nitro or $C_1$-$C_4$ alkanoylamino, and the radicals X independently denote N or C—H, with the proviso that at least one radical X denotes C—H.

Any radical denoting alkyl may be a straight-chain or branched alkyl radical.

Examples of alkyl groups $C_1$-$C_6$alkyl or $C_1$-$C_{12}$alkyl, include methyl, ethyl, n-propyl, isopropyl, n-butyl, isobutyl, sec-butyl, tert-butyl, n-pentyl, isopentyl, neopentyl, n-hexyl, n-octyl, i-octyl, n-decyl and n-dodecyl. $C_1$-$C_{12}$alkyl may be interrupted one or more times by —O—, —S—, —NR$_4$—, —CO—, —COO— or —OOC—, and may be substituted by cyano, carboxy, hydroxy, $C_6$-$C_{10}$ aryl or $C_6$-$C_{10}$ aryloxy. In an interesting embodiment $C_1$-$C_6$alkyl is methyl or ethyl. In an interesting embodiment $C_1$-$C_{12}$alkyl is methyl, ethyl, n-propyl or n-butyl.

Any radical denoting alkoxy may be a straight-chain or branched alkoxy radical.

$C_1$-$C_6$alkoxy means, for example, methoxy, ethoxy, n-propoxy, isopropoxy, n-butoxy, iso-butoxy, sec-butoxy, tert-butoxy, n-pentoxy, neopentoxy or n-hexoxy, in particular methoxy or ethoxy.

$C_6$-$C_{10}$ aryl means, for example, phenyl or naphthyl, preferably phenyl, which may be substituted by cyano, carboxy, hydroxy, halogen, $C_1$-$C_6$alkyl or $C_1$-$C_6$alkoxy.

$C_6$-$C_{10}$ aryloxy means, for example, phenoxy or naphthoxy, preferably phenoxy, which may be substituted by cyano, carboxy, hydroxy, halogen, $C_1$-$C_6$alkyl or $C_1$-$C_6$alkoxy. Any radical denoting halogen may be fluorine, chlorine or bromine, in particular chlorine or bromine.

$C_1$-$C_6$alkylcarbonyl means, for example, acetyl, propionyl, butanoyl, n-pentanoyl, isopentanoyl, hexanoyl or heptanoyl.

$C_6$-$C_{10}$ arylcarbonyl means, for example, benzoyl or naphthoyl, preferably benzoyl.

$C_1$-$C_{10}$alkoxycarbonyl means, for example, methoxycarbonyl, ethoxycarbonyl, n-propoxycarbonyl, isopropoxycarbonyl, n-butoxycarbonyl, iso-butoxycarbonyl, sec-butoxycarbonyl, tert-butoxycarbonyl, n-pentoxycarbonyl, neopentoxycarbonyl, or n-hexoxycarbonyl.

$C_1$-$C_6$alkylsulfonyl means, for example, methylsulfonyl, ethylsulfonyl, n-propylsulfonyl, isopropylsulfonyl, n-butylsulfonyl, isobutylsulfonyl, sec-butylsulfonyl, tert-butylsulfonyl, n-pentylsulfonyl, isopentylsulfonyl, neopentylsulfonyl or n-hexylsulfonyl, in particular methylsulfonyl or ethylsulfonyl.

$C_1$-$C_6$alkylsulfonylamino means, for example, methylsulfonylamino, ethylsulfonylamino, n-propylsulfonylamino, isopropylsulfonylamino, n-butylsulfonylamino, isobutylsulfonylamino, sec-butylsulfonylamino, tert-butylsulfonylamino, n-pentylsulfonyl-amino, isopentylsulfonyl-amino, neopentylsulfonylamino or n-hexylsulfonylamino, in particular methylsulfonylamino or ethylsulfonylamino.

$C_1$-$C_6$ alkanoylamino means, for example, acetylamino, propionylamino, butanoylamino, n-pentanoylamino, isopentanoylamino, or hexanoylamino, in particular acetylamino or propionylamino.

In a preferred embodiment of the azo dyes of formula (1) $R_1$ and $R_2$ independently denote hydrogen, methyl, ethyl, n-propyl, i-propyl or n-butyl, 2-methoxyethyl, 3-methoxypropyl, 4-methoxybutyl, 2-ethoxyethyl, 3-ethoxypropyl, 4-ethoxybutyl, phenyl, tolyl, benzyl, or 2-phenylethyl.

Tolyl means o-, m- or p-tolyl.

In a more preferred embodiment of the azo dyes of formula (1) $R_1$ is hydrogen and $R_2$ denotes hydrogen, methyl, ethyl, n-propyl, i-propyl or n-butyl, 2-methoxyethyl, 3-methoxypropyl, 4-methoxybutyl, 2-ethoxyethyl, 3-ethoxypropyl, 4-ethoxybutyl, phenyl, tolyl, benzyl, or 2-phenylethyl.

In an interesting embodiment of the azo dyes of formula (1) $R_1$ and $R_2$ are hydrogen.

In an interesting embodiment of the azo dye of formula (1) both radicals X denote C—H. In this case, the radical of formula (1b)

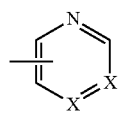

(1b)

in the azo dye of formula (1) is, for example, pyridine-2-yl, pyridine-3-yl or pyridine-4-yl.

In another interesting embodiment of the azo dye of formula (1) one of the radicals X denotes C—H and the other one of the radical X denotes N. In this case the radical of formula (1b) is, for example, pyrimidine-2-yl, pyrimidine-4-yl, pyrimidine-5-yl or pyrazine-2-yl.

In a preferred embodiment of the azo dyes of formula (1) $R_3$ and $R_4$ are each independently of the other hydrogen, halogen, nitro, cyano, trifluoromethyl, methylsulfonyl, ethylsulfonyl, acetylamino, or propionylamino and $R_5$ is halogen, nitro, cyano, trifluoromethyl, methylsulfonyl, ethylsulfonyl, acetylamino, or propionylamino.

In a more preferred embodiment of the azo dyes of formula (1) $R_3$ and $R_4$ are each independently of the other hydrogen, halogen, nitro, cyano, or trifluoromethyl and $R_5$ is halogen, nitro, cyano, or trifluoromethyl.

In another preferred embodiment of the azo dyes of formula (1) $R_6$, $R_7$, $R_3$ and $R_9$ independently of each other are hydrogen, hydroxy, halogen, acetylamino, or propionylamino.

In an interesting embodiment of the azo dye of formula (1) D is a radical of formula (2).

The present invention also relates to a process for the preparation an azo dye of formula (1), which comprises diazotizing an amine compound of formula

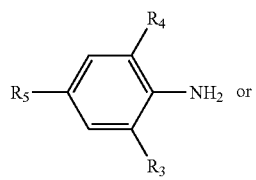

(2a)

or

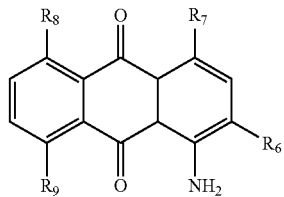

(3a)

in accordance with a customary procedure, and then coupling the diazotized amine to a coupling component of the formula

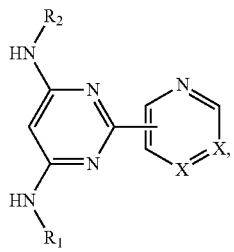

(1a)

wherein $R_1$, $R_2$, $R_3$, $R_4$, $R_5$, $R_6$, $R_7$, $R_3$, $R_9$ and X are as defined above.

The diazotisation of the amine compound of formula (2a) or (3a) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (2a) or (3a) to the coupling component of formula (1a) is likewise accomplished in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The compounds of formula (2a) or (3a) are known or can be prepared in a manner known per se. The precursor of the coupling components of formula (1a) are known or can be prepared in a manner known per se, for example as described in Synthesis 2010, No. 7 pp. 1091-1096 (2010).

The coupling components of formula (1a) are new. Accordingly, the present invention also relates to the compounds of formula

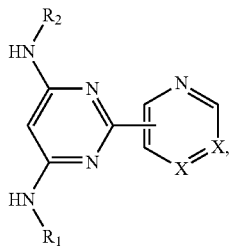

(1a)

wherein $R_1$, $R_2$ and X are as defined above, which can be used, for example, as coupling components for the preparation of disperse azo dyes. The preparation is described in the experimental section.

The dyes according to the invention may be used for dyeing or printing semi-synthetic and especially synthetic hydrophobic fibre materials, more especially textile materials. Textile materials composed of blend fabrics that comprise such semi-synthetic or synthetic hydrophobic fibre materials can also be dyed or printed using the dyes according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride or on polyamide.

The application of the dyes according to the invention to the fibre materials is accomplished in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2/½-acetate is dyed preferably at from 65 to 85° C. and cellulose triacetate at temperatures of from 65 to 115° C.

The dyes according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants.

The inks can be prepared in customary manner by mixing together the individual components, if necessary in combination with suitable dispersing agents, in the desired amount of water.

The dyes according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to light.

Furthermore, the dyes and dye mixtures according to the invention are also well suited to dyeing hydrophobic fibre materials from supercritical $CO_2$.

The present invention relates to the above-mentioned use of the dyes according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found hereinbefore in the more detailed description of the use of the dyes according to the invention.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is droplets are generated only when required for the printing operation. The production of the droplets can be accomplished, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimetres.

1. PREPARATION EXAMPLES

Preparation Example 1: Dyestuff of Formula (101)

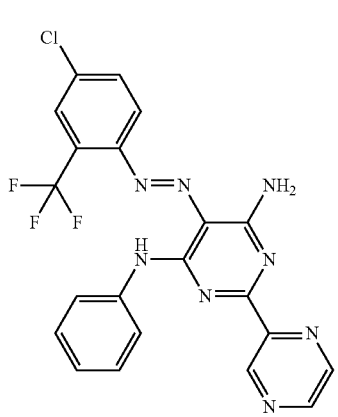

(101)

Step A:

The starting compound pyrazine-2-carbonitril is converted to pyrazine-2-carboximidamide hydrochloride according to the scheme below, as described in Synthesis 2010, No. 7 pp. 1091-1096 (2010). A white solid is obtained in a yield of 85%.

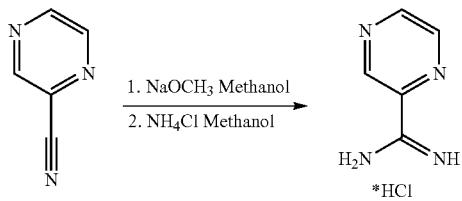

Step B:

Pyrazine-2-carboximidamide hydrochloride obtained according to step A is converted to 2-(pyrazine-2-yl)pyrimidine-4,6-diol according to the scheme below, as described in Synthesis 2010, No. 7 pp. 1091-1096 (2010). A pale brown solid is obtained in a yield of 94%.

$^1$H-NMR (DMSO-ds, 250 MHz): δ=9.37 (d, 1H, aromat. H), 8.87 (d, 1H, aromat. H), 8.81 (dd, 1H, aromat H), 5.48 (s, 1H, aromat H).

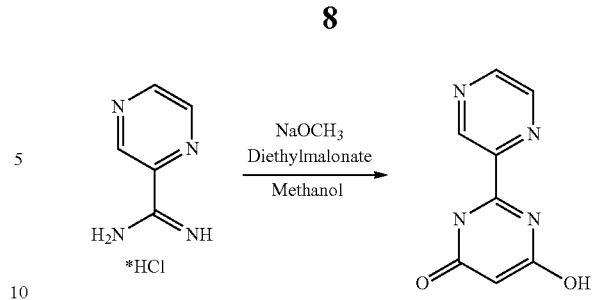

Step C:

2-(Pyrazine-2-yl)pyrimidine-4,6-diol obtained according to step B is converted with phosphorous oxychloride to 4,6-dichloro-2-(pyrazine-2-yl)pyrimidine according to the scheme below, as described in Synthesis 2010, No. 7 pp. 1091-1096 (2010). A white solid is obtained in a yield of 68%.

$^1$H-NMR (DMSO-ds, 250 MHz): δ=9.49 (d, 1H, aromat. H), 8.89 (m, 2H, aromat. H), 8.20 (s, 1H, aromat H)

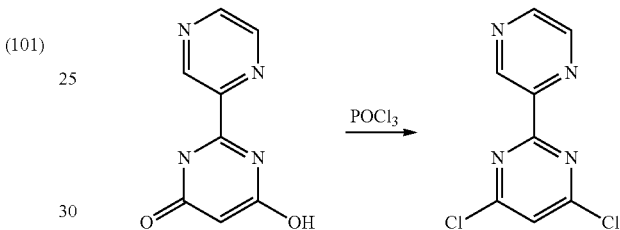

Step D:

A suspension of 77.2 g of 4,6-dichloro-2-(pyrazine-2-yl)pyrimidine in 750 ml concentrated ammonia is stirred for 22 hours at 87° C. at a pressure of 6.5 bar. After cooling to room temperature, the mixture is filtered off and the filter cake is washed neural with water. After drying 52.8 g of 4-amino-6-chloro-2-(pyrazine-2-yl)pyrimidine are obtained as a brown solid compound.

$^1$H-NMR (DMSO-ds, 250 MHz): δ=9.34 (d, 1H, aromat. H), 8.75 (m, 2H, aromat. H), 7.54 (s broad, 2H, NH$_2$), 6.52 (s, 1H, aromat H).

Step E:

50 g of 4-amino-6-chloro-2-(pyrazine-2-yl)pyrimidine are added to 200 g aniline. The mixture is stirred at 105° C. for seven hours. After completion of the reaction, the excess of aniline is distilled of while adding 1.4 l of water within 5 hours at a temperature between 75 and 100° C.

After addition of hydrochloric acid, the reaction mixture is filtered off and the filter cake is washed neutral with water. After drying 63.6 g of 4-amino-6-phenylamino-2-(pyrazine-2-yl)pyrimidine are obtained as a dark solid compound.

$^1$H-NMR (DMSO-ds, 250 MHz): δ=10.68 (s broad, 1H, NH), 9.42 (d, 1H, aromat. H), 8.97 (d, 1H, aromat. H), 8.89 (dd, 1H, aromat. H), 8.13 (s broad, 2H, NH$_2$), 7.54 (d, 2H, aromat. H), 7.44 (t, 2H, aromat. H), 7.18 (t, 1H, aromat. H), 5.60 (s, 1H, aromat H).

Step F:

2 g of 4-chloro-2-trifluoromethylaniline is diazotized in a mixture of 30 g of acetic acid, 5.5 g of sulfuric acid and 13 g of water with 3.4 g nitrosylsulfuric acid within 5.5 hours at a temperature of between −3 and 6° C. Afterwards, the diazo solution is added to a mixture of 2.7 g of 4-amino-6-phenylamino-2-(pyrazine-2-yl)pyrimidine obtained in accordance with step E, 100 g of acetic acid (80%), 250 of water and 13 g of aqueous ammonia (28%) at a temperature of about 5° C. within five minutes. Thereafter the mixture is warmed to room temperature within 15 hours. After the addition of 100 g of ethanol the mixture is filtrated. The filter cake is washed with water. The product is cleaned through stirring in 300 g of Methanol, 100 g of NMP and 50 g of water. After filtration and washing with water the compound is dried. 1.5 g of the dyestuff of formula (101) are obtained as a red solid compound.

$^1$H-NMR (CDCl$_3$, 250 MHz): δ=9.68 (d, 1H, aromat. H), 8.78 (dd, 1H, aromat. H), 8.70 (d, 1H, aromat. H), 7.79 (m, 4H, aromat. H), 7.63 (dd, 1H, aromat. H), 7.46 (t, 2H, aromat. H), 7.23 (t, 1H, aromat. H).

Preparation of 4,6-diamino-2-(pyrazine-2-yl)pyrimidine:

A suspension of 31.5 g of 4,6-dichloro-2-(pyrazine-2-yl) pyrimidine in 400 ml concentrated ammonia is stirred for 21 hours at 175° C. at a pressure of 28 bar. After cooling to room temperature, the aqueous ammonia is removed on a rotary evaporator and the residue is recrystallized in DMF/toluene. After drying 20.8 g of 4,6-diamino-2-(pyrazine-2-yl)pyrimidine are obtained as a brown solid compound.

$^1$H-NMR (DMSO-ds, 250 MHz): δ=9.35 (d, 1H, aromat. H), 8.79 (d, 1H, aromat. H), 8.76 (dd, 1H, aromat. H), 7.06 (s broad, 4H, NH$_2$), 5.60 (s, 1H, aromat H).

The dyes of Preparation Examples 2 to 114 listed in the following Table can be prepared in analogy to Preparation Example 1 above.

| Preparation Example | λ$_{max}$/nm | Dyestuff |
|---|---|---|
| 2 | 430 | 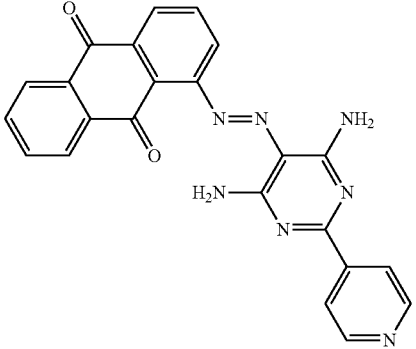 [SMILES: Nc1nc(-c2ccncc2)nc(N)c1/N=N/c1cccc2c1C(=O)c1ccccc1C2=O] |
| 3 | 450 | 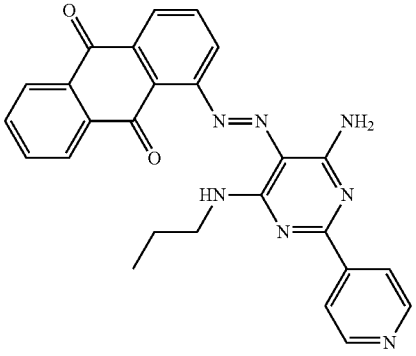 [SMILES: CCCNc1nc(-c2ccncc2)nc(N)c1/N=N/c1cccc2c1C(=O)c1ccccc1C2=O] |
| 4 | 454 | 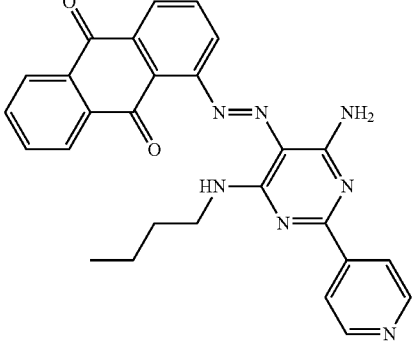 |

-continued
| Preparation Example | $\lambda_{max}$/nm | Dyestuff |
|---|---|---|
| 5 | 452 | 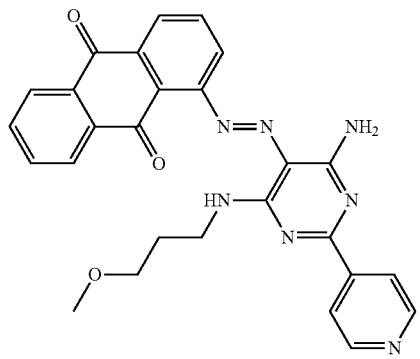 [SMILES: COCCCNc1nc(-c2ccncc2)nc(N)c1/N=N/c1cccc2c1C(=O)c1ccccc1C2=O] |
| 6 | 452 | 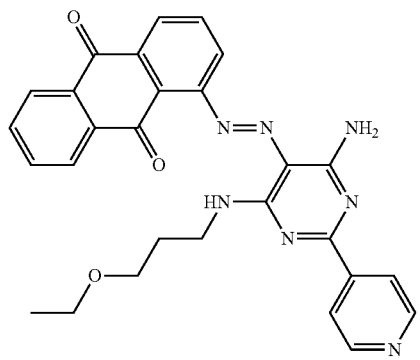 [SMILES: CCOCCCNc1nc(-c2ccncc2)nc(N)c1/N=N/c1cccc2c1C(=O)c1ccccc1C2=O] |
| 7 | 462 | 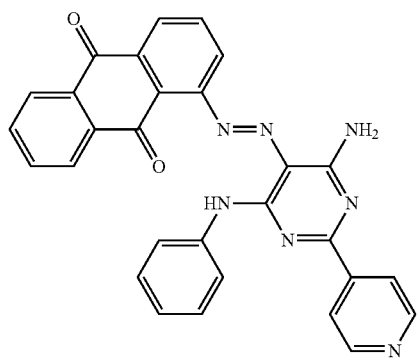 [SMILES: Nc1nc(-c2ccncc2)nc(Nc2ccccc2)c1/N=N/c1cccc2c1C(=O)c1ccccc1C2=O] |
| 8 | | 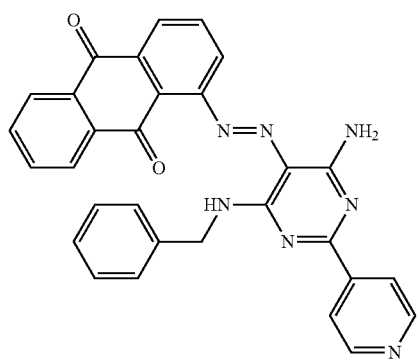 [SMILES: Nc1nc(-c2ccncc2)nc(NCc2ccccc2)c1/N=N/c1cccc2c1C(=O)c1ccccc1C2=O] |

-continued
| Preparation Example | $\lambda_{max}$/nm | Dyestuff |
|---|---|---|
| 9 | 432 | 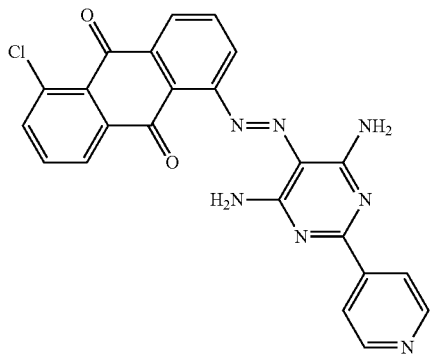 [SMILES: Nc1nc(-c2ccncc2)nc(N)c1/N=N/c1cccc2c1C(=O)c1cccc(Cl)c1C2=O] |
| 10 | 424 | 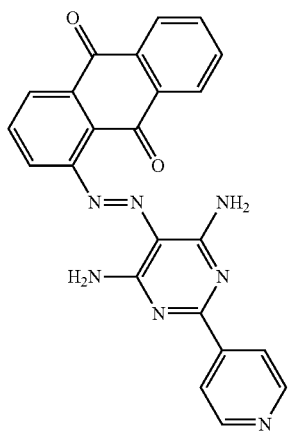 [SMILES: Nc1nc(-c2ccncc2)nc(N)c1/N=N/c1cccc2c1C(=O)c1ccccc1C2=O] |
| 11 | 429 | 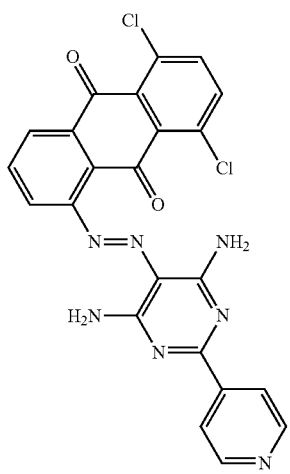 [SMILES: Nc1nc(-c2ccncc2)nc(N)c1/N=N/c1cccc2c1C(=O)c1c(Cl)ccc(Cl)c1C2=O] |

-continued
| Preparation Example | $\lambda_{max}$/nm | Dyestuff |
|---|---|---|
| 12 | 436 | 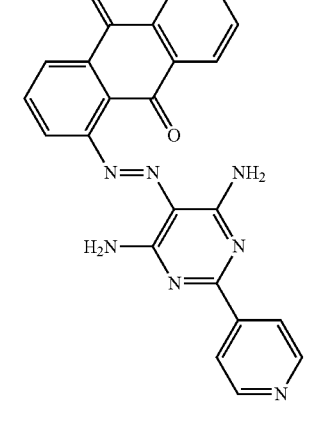 |
| 13 | 414 | 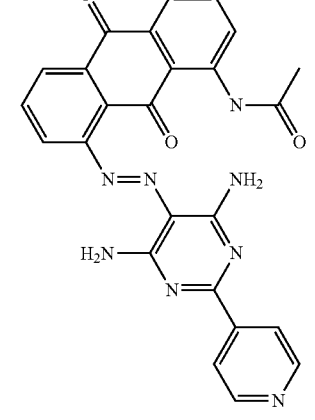 |
| 14 | 432 | 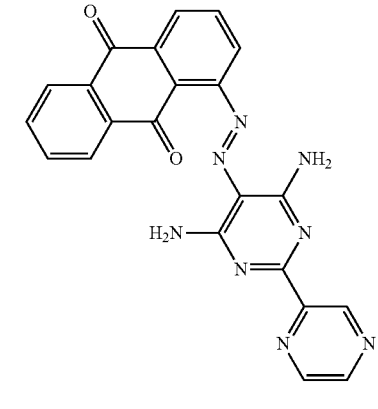 [SMILES: Nc1nc(-c2cnccn2)nc(N)c1/N=N/c1cccc2c1C(=O)c1ccccc1C2=O] |
| 15 | 432 | 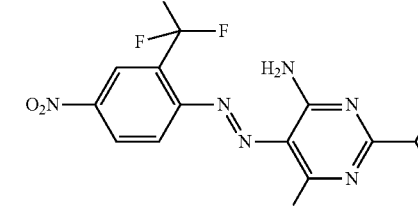 |

-continued
| Preparation Example | λ_max/nm | Dyestuff |
|---|---|---|
| 16 | 456 | 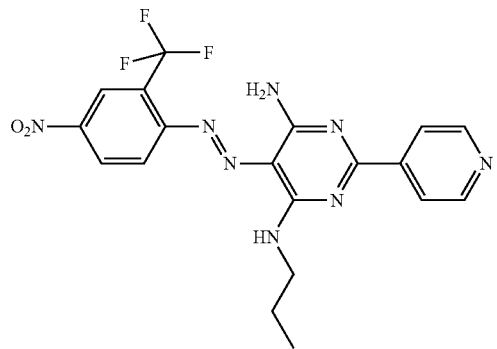 [SMILES: CCCNc1nc(-c2ccncc2)nc(N)c1/N=N/c1ccc([N+](=O)[O-])cc1C(F)(F)F] |
| 17 | 456 | 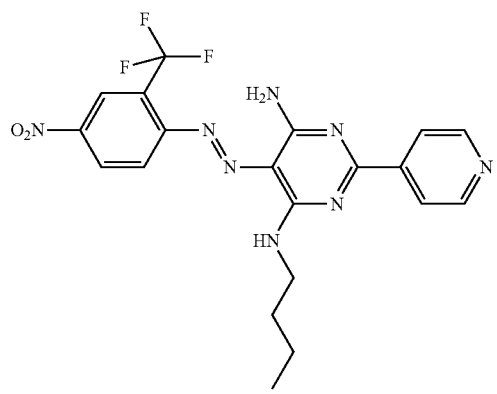 [SMILES: CCCCNc1nc(-c2ccncc2)nc(N)c1/N=N/c1ccc([N+](=O)[O-])cc1C(F)(F)F] |
| 18 | 465 | 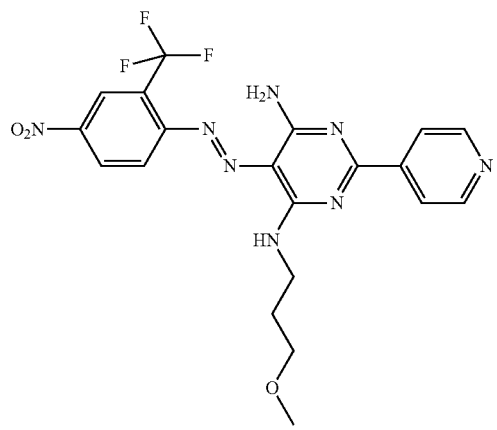 [SMILES: COCCCNc1nc(-c2ccncc2)nc(N)c1/N=N/c1ccc([N+](=O)[O-])cc1C(F)(F)F] |

-continued
| Preparation Example | $\lambda_{max}$/nm | Dyestuff |
|---|---|---|
| 19 | 466 | 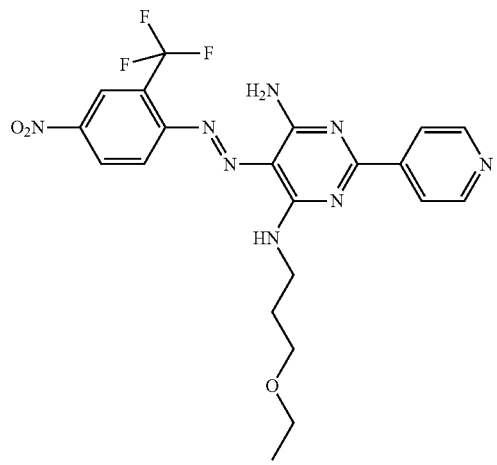 [SMILES: CCOCCCNc1nc(-c2ccncc2)nc(N)c1/N=N/c1ccc([N+](=O)[O-])cc1C(F)(F)F] |
| 20 | 468 | 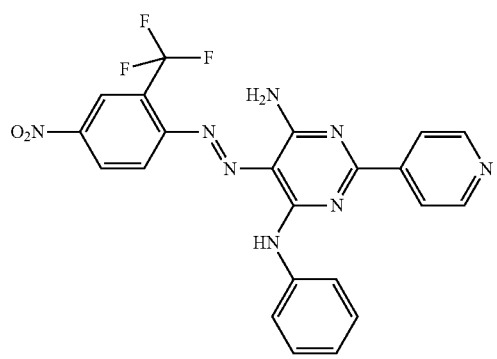 [SMILES: Nc1nc(-c2ccncc2)nc(Nc2ccccc2)c1/N=N/c1ccc([N+](=O)[O-])cc1C(F)(F)F] |
| 21 | 452 | 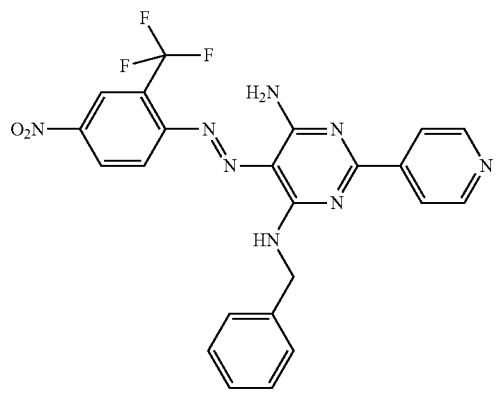 [SMILES: Nc1nc(-c2ccncc2)nc(NCc2ccccc2)c1/N=N/c1ccc([N+](=O)[O-])cc1C(F)(F)F] |
| 22 | 434 | 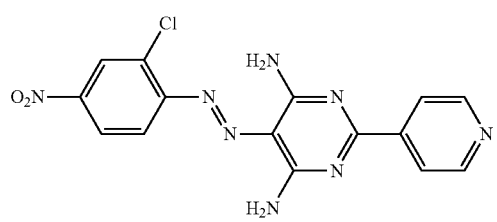 [SMILES: Nc1nc(-c2ccncc2)nc(N)c1/N=N/c1ccc([N+](=O)[O-])cc1Cl] |

-continued
| Preparation Example | $\lambda_{max}$/nm | Dyestuff |
|---|---|---|
| 23 | 456 | 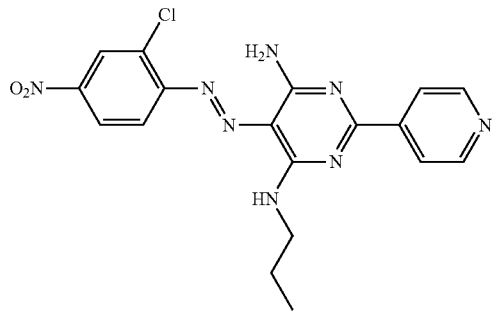 [SMILES: CCCNc1nc(-c2ccncc2)nc(N)c1/N=N/c1ccc([N+](=O)[O-])cc1Cl] |
| 24 | 456 | 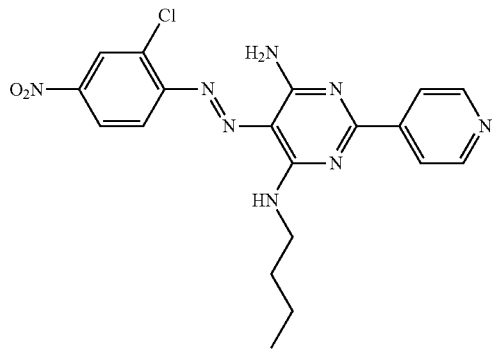 [SMILES: CCCCNc1nc(-c2ccncc2)nc(N)c1/N=N/c1ccc([N+](=O)[O-])cc1Cl] |
| 25 | 456 | 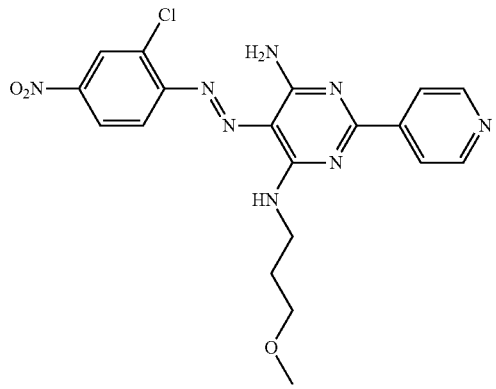 [SMILES: COCCCNc1nc(-c2ccncc2)nc(N)c1/N=N/c1ccc([N+](=O)[O-])cc1Cl] |
| 26 | 456 | 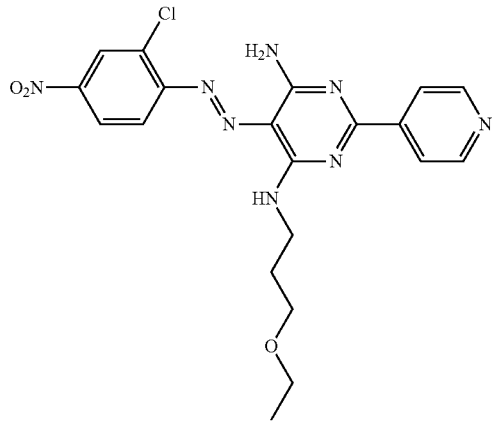 [SMILES: CCOCCCNc1nc(-c2ccncc2)nc(N)c1/N=N/c1ccc([N+](=O)[O-])cc1Cl] |

-continued
| Preparation Example | $\lambda_{max}$/nm | Dyestuff |
|---|---|---|
| 27 | 476 | 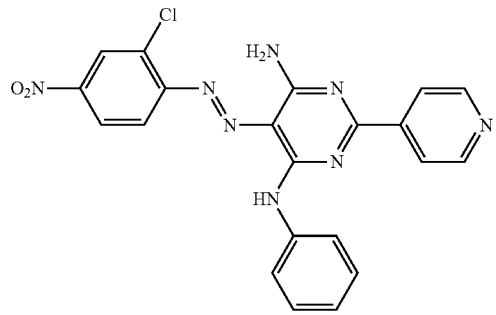 [SMILES: Nc1nc(-c2ccncc2)nc(Nc2ccccc2)c1/N=N/c1ccc([N+](=O)[O-])cc1Cl] |
| 28 | 454 | 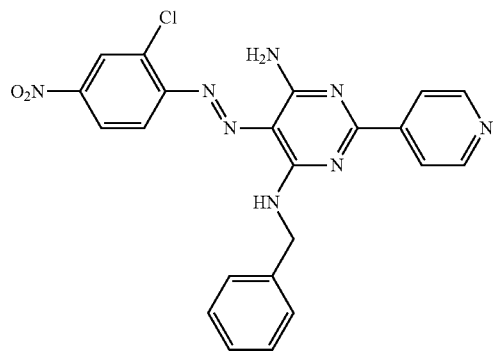 [SMILES: Nc1nc(-c2ccncc2)nc(NCc2ccccc2)c1/N=N/c1ccc([N+](=O)[O-])cc1Cl] |
| 29 | 434 | 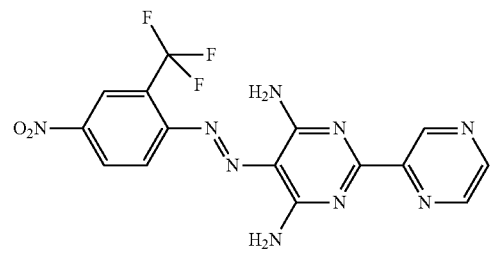 [SMILES: Nc1nc(-c2cnccn2)nc(N)c1/N=N/c1ccc([N+](=O)[O-])cc1C(F)(F)F] |
| 30 | 436 | 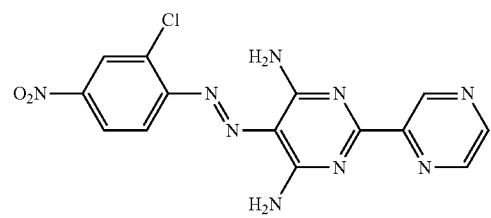 [SMILES: Nc1nc(-c2cnccn2)nc(N)c1/N=N/c1ccc([N+](=O)[O-])cc1Cl] |
| 31 | 432 | 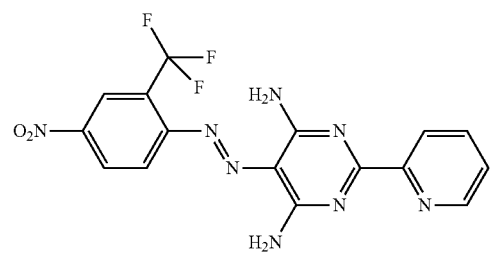 [SMILES: Nc1nc(-c2ccccn2)nc(N)c1/N=N/c1ccc([N+](=O)[O-])cc1C(F)(F)F] |

-continued
| Preparation Example | $\lambda_{max}$/nm | Dyestuff |
|---|---|---|
| 32 | 440 | 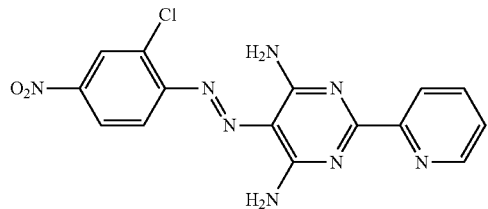 [SMILES: Nc1nc(-c2ccccn2)nc(N)c1/N=N/c1ccc([N+](=O)[O-])cc1Cl] |
| 33 | 438 | 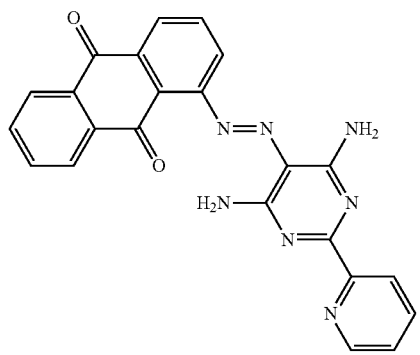 [SMILES: Nc1nc(-c2ccccn2)nc(N)c1/N=N/c1cccc2c1C(=O)c1ccccc1C2=O] |
| 34 | 428 | 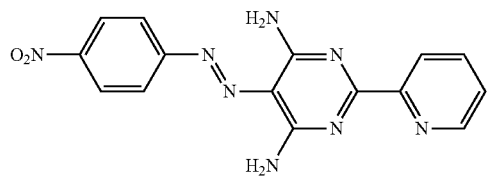 [SMILES: Nc1nc(-c2ccccn2)nc(N)c1/N=N/c1ccc([N+](=O)[O-])cc1] |
| 35 | 404 | 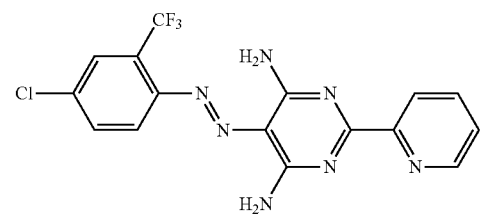 [SMILES: Nc1nc(-c2ccccn2)nc(N)c1/N=N/c1ccc(Cl)cc1C(F)(F)F] |
| 36 | 420 | 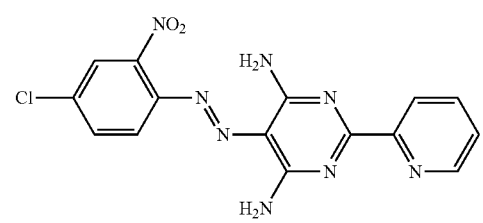 |

-continued
| Preparation Example | $\lambda_{max}$/nm | Dyestuff |
|---|---|---|
| 37 | 424 | 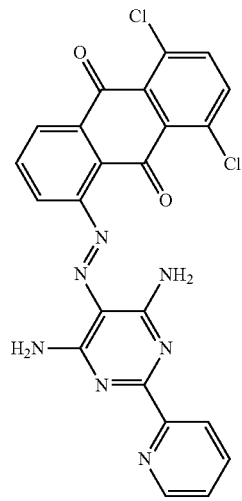 [SMILES: Nc1nc(-c2ccccn2)nc(N)c1/N=N/c1cccc2c1C(=O)c1c(Cl)ccc(Cl)c1C2=O] |
| 38 | 436 | 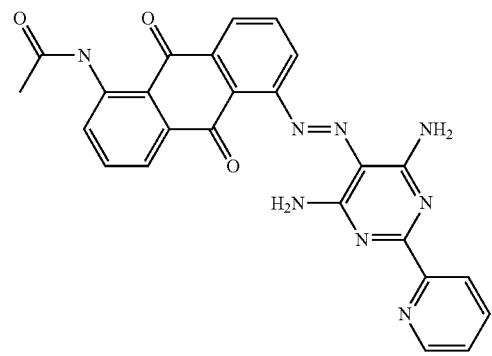 [SMILES: CC(=O)Nc1cccc2c1C(=O)c1cccc(/N=N/c3c(N)nc(-c4ccccn4)nc3N)c1C2=O] |
| 39 | 432 | 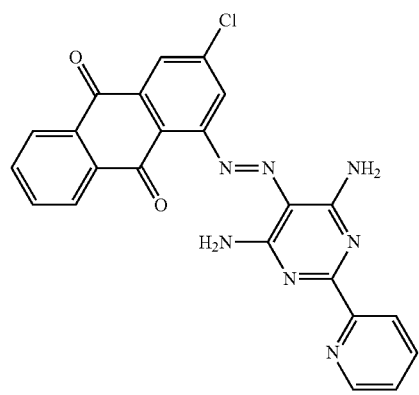 [SMILES: Nc1nc(-c2ccccn2)nc(N)c1/N=N/c1cc(Cl)cc2c1C(=O)c1ccccc1C2=O] |

-continued

| Preparation Example | $\lambda_{max}$/nm | Dyestuff |
|---|---|---|
| 40 | 438 | |
| 41 | 436 | |
| 42 | 434 | |

-continued
| Preparation Example | λ$_{max}$/nm | Dyestuff |
|---|---|---|
| 43 | 480 | 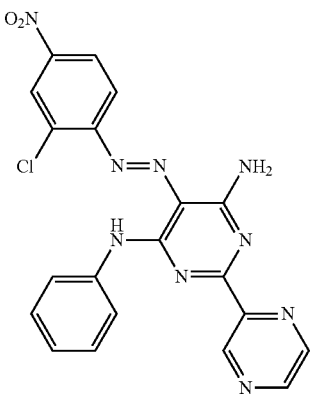 [SMILES: Nc1nc(-c2cnccn2)nc(Nc2ccccc2)c1/N=N/c1ccc([N+](=O)[O-])cc1Cl] |
| 44 | 432 | 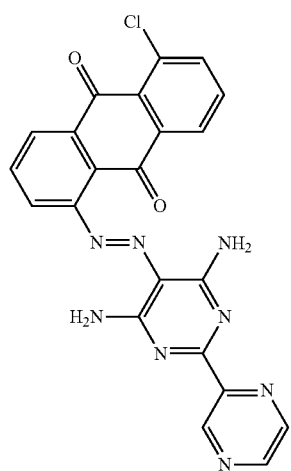 [SMILES: Nc1nc(-c2cnccn2)nc(N)c1/N=N/c1cccc2c1C(=O)c1cccc(Cl)c1C2=O] |
| 45 | 464 | 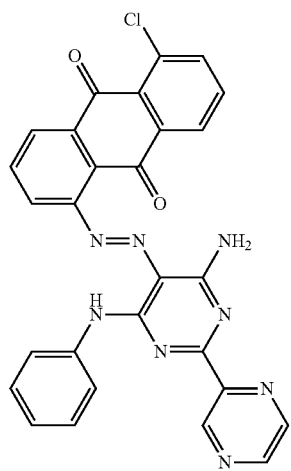 [SMILES: Nc1nc(-c2cnccn2)nc(Nc2ccccc2)c1/N=N/c1cccc2c1C(=O)c1cccc(Cl)c1C2=O] |

-continued
| Preparation Example | λ$_{max}$/nm | Dyestuff |
|---|---|---|
| 46 | 428 | 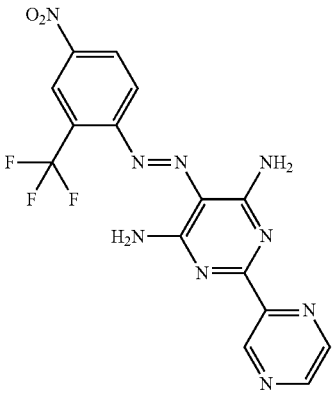 |
| 47 | 466 | 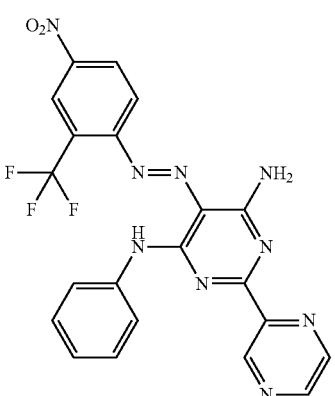 |
| 48 | 440 | 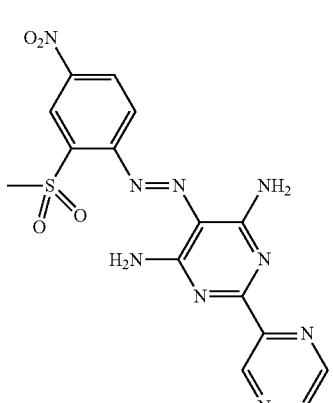 |
| 49 | 482 | 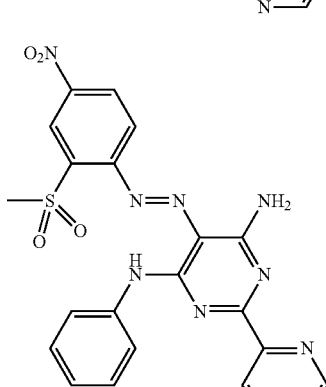 |

-continued
| Preparation Example | λ$_{max}$/nm | Dyestuff |
|---|---|---|
| 50 | 442 | 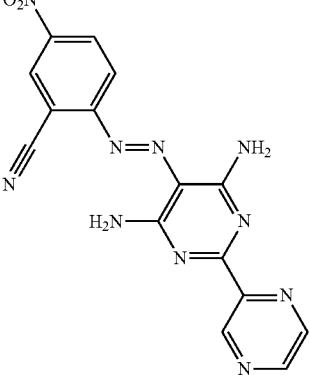 |
| 51 | 488 | 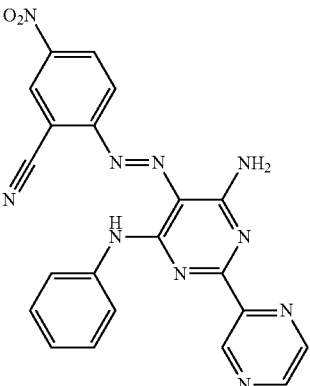 |
| 52 | 442 | 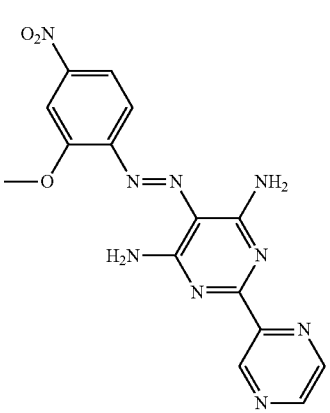 [SMILES: COc1cc([N+](=O)[O-])ccc1/N=N/c1c(N)nc(-c2cnccn2)nc1N] |
| 53 | 484 | 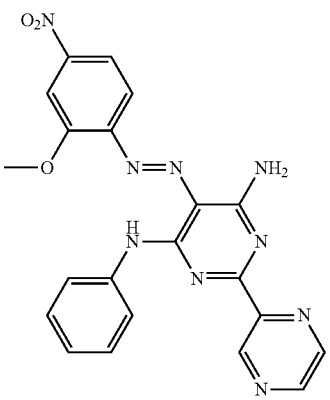 [SMILES: COc1cc([N+](=O)[O-])ccc1/N=N/c1c(N)nc(-c2cnccn2)nc1Nc1ccccc1] |

-continued
| Preparation Example | $\lambda_{max}$/nm | Dyestuff |
|---|---|---|
| 54 | 408 | 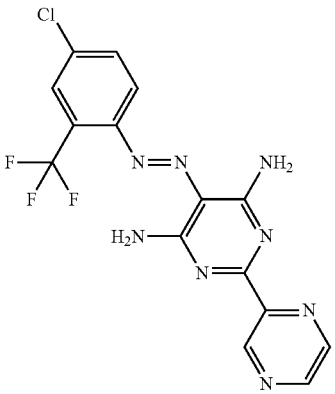 [SMILES: Nc1nc(-c2cnccn2)nc(N)c1/N=N/c1ccc(Cl)cc1C(F)(F)F] |
| 55 | 436 | 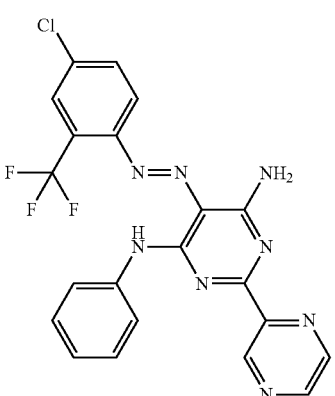 |
| 56 | 420 | 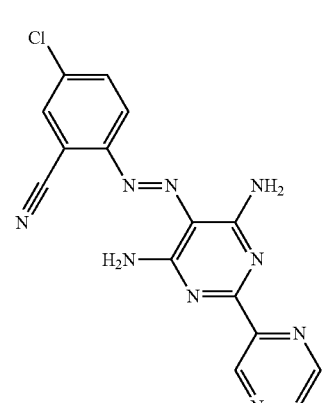 |
| 57 | 458 | 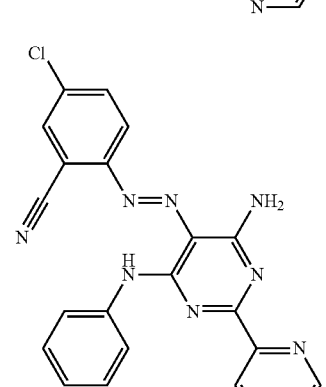 |

-continued
| Preparation Example | $\lambda_{max}$/nm | Dyestuff |
|---|---|---|
| 58 | 416 | 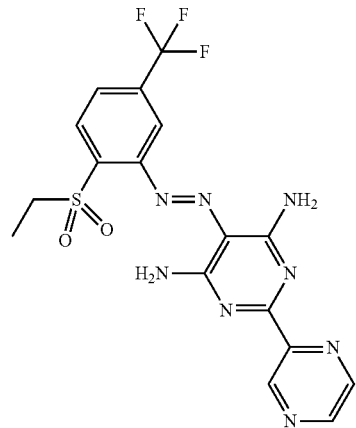 [SMILES: CCS(=O)(=O)c1ccc(C(F)(F)F)cc1/N=N/c1c(N)nc(-c2cnccn2)nc1N] |
| 59 | 442 | 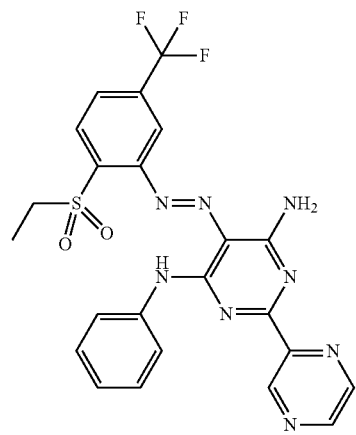 [SMILES: CCS(=O)(=O)c1ccc(C(F)(F)F)cc1/N=N/c1c(N)nc(-c2cnccn2)nc1Nc1ccccc1] |
| 60 | 422 | 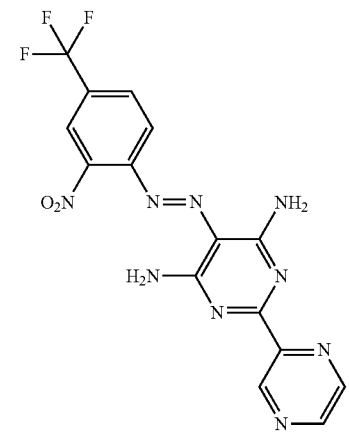 [SMILES: Nc1nc(-c2cnccn2)nc(N)c1/N=N/c1ccc(C(F)(F)F)cc1[N+](=O)[O-]] |

-continued
| Preparation Example | $\lambda_{max}$/nm | Dyestuff |
|---|---|---|
| 61 | 452 | 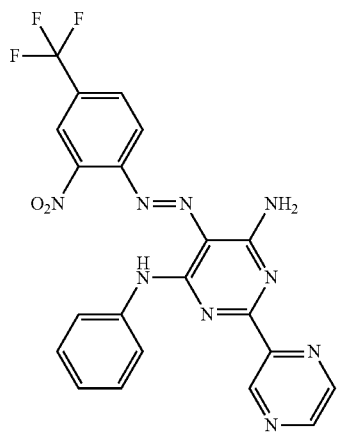 [SMILES: Nc1nc(-c2cnccn2)nc(Nc2ccccc2)c1/N=N/c1ccc(C(F)(F)F)cc1[N+](=O)[O-]] |
| 62 | 436 | 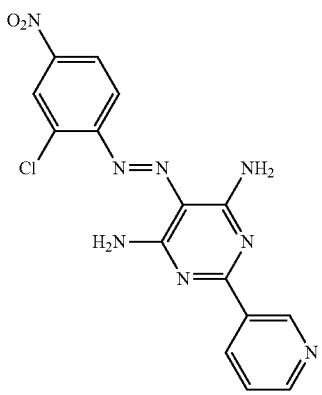 [SMILES: Nc1nc(-c2cccnc2)nc(N)c1/N=N/c1ccc([N+](=O)[O-])cc1Cl] |
| 63 | 432 | 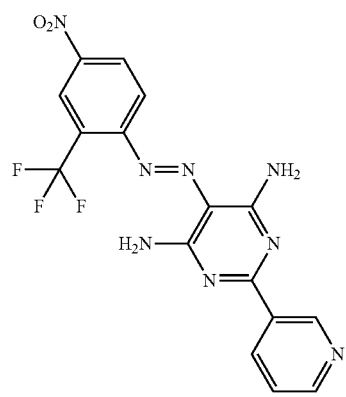 |

-continued
| Preparation Example | $\lambda_{max}$/nm | Dyestuff |
|---|---|---|
| 64 | 428 | 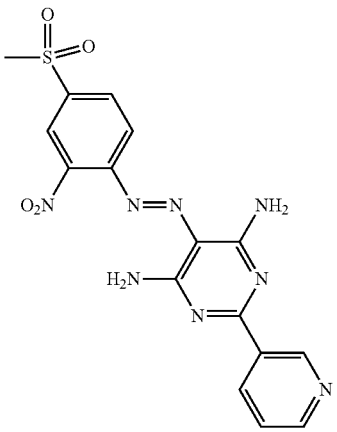 [SMILES: CS(=O)(=O)c1ccc(/N=N/c2c(N)nc(-c3cccnc3)nc2N)c([N+](=O)[O-])c1] |
| 65 | 444 | 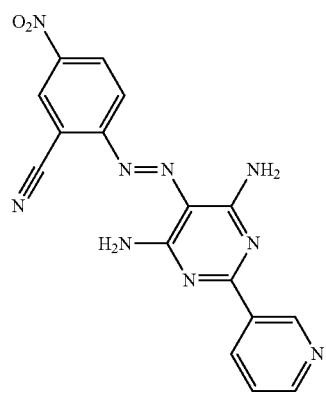 [SMILES: N#Cc1cc([N+](=O)[O-])ccc1/N=N/c1c(N)nc(-c2cccnc2)nc1N] |
| 66 | 406 | 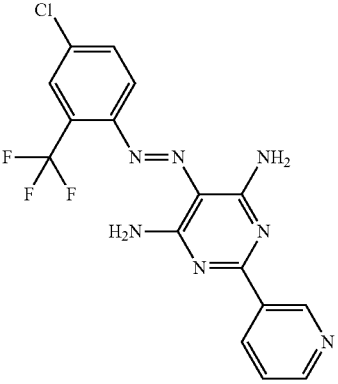 [SMILES: Nc1nc(-c2cccnc2)nc(N)c1/N=N/c1ccc(Cl)cc1C(F)(F)F] |
| 67 | 440 | 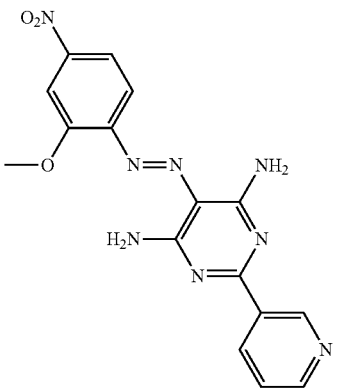 [SMILES: COc1cc([N+](=O)[O-])ccc1/N=N/c1c(N)nc(-c2cccnc2)nc1N] |

-continued
| Preparation Example | $\lambda_{max}$/nm | Dyestuff |
|---|---|---|
| 68 | 442 | 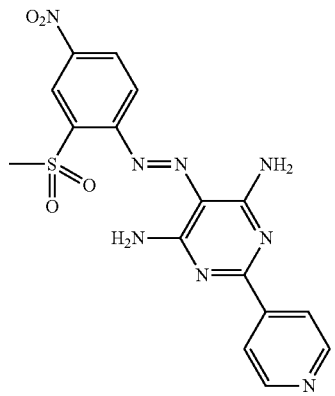 [SMILES: CS(=O)(=O)c1cc([N+](=O)[O-])ccc1/N=N/c1c(N)nc(-c2ccncc2)nc1N] |
| 69 | 444 | 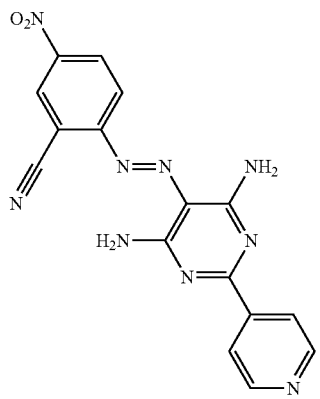 [SMILES: N#Cc1cc([N+](=O)[O-])ccc1/N=N/c1c(N)nc(-c2ccncc2)nc1N] |
| 70 | 476 | 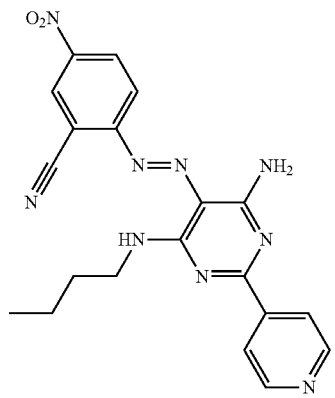 [SMILES: CCCCNc1nc(-c2ccncc2)nc(N)c1/N=N/c1ccc([N+](=O)[O-])cc1C#N] |
| 71 | 464 | 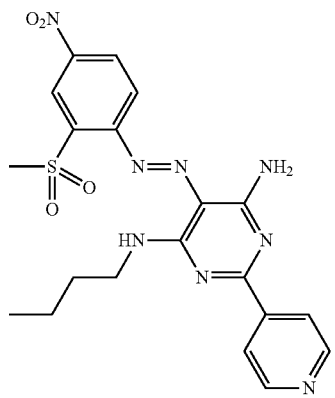 [SMILES: CCCCNc1nc(-c2ccncc2)nc(N)c1/N=N/c1ccc([N+](=O)[O-])cc1S(C)(=O)=O] |

-continued
| Preparation Example | $\lambda_{max}$/nm | Dyestuff |
|---|---|---|
| 72 | 464 | 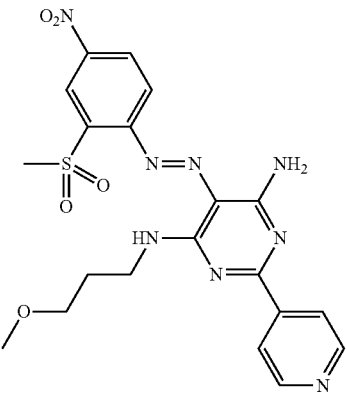 [SMILES: COCCCNc1nc(-c2ccncc2)nc(N)c1/N=N/c1ccc([N+](=O)[O-])cc1S(C)(=O)=O] |
| 73 | 466 | 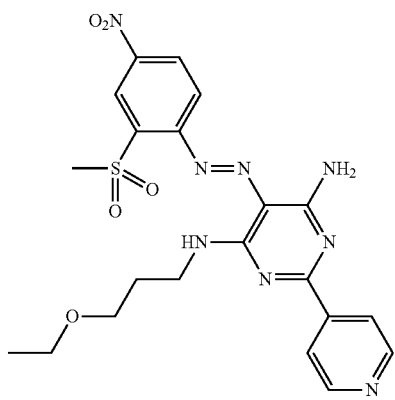 [SMILES: CCOCCCNc1nc(-c2ccncc2)nc(N)c1/N=N/c1ccc([N+](=O)[O-])cc1S(C)(=O)=O] |
| 74 | 492 | 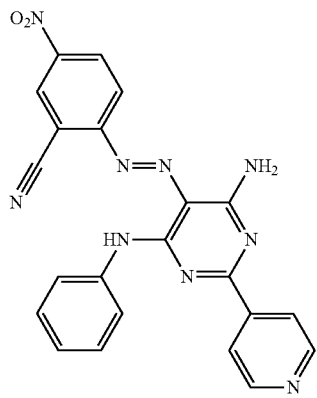 [SMILES: N#Cc1cc([N+](=O)[O-])ccc1/N=N/c1c(N)nc(-c2ccncc2)nc1Nc1ccccc1] |
| 75 | 464 | 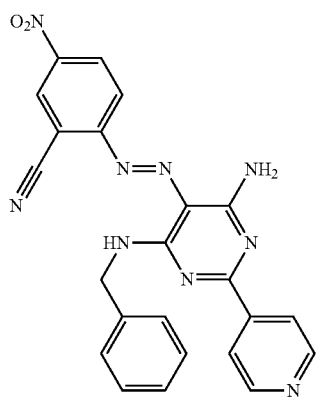 [SMILES: N#Cc1cc([N+](=O)[O-])ccc1/N=N/c1c(N)nc(-c2ccncc2)nc1NCc1ccccc1] |

-continued
| Preparation Example | $\lambda_{max}$/nm | Dyestuff |
|---|---|---|
| 76 | 462 | 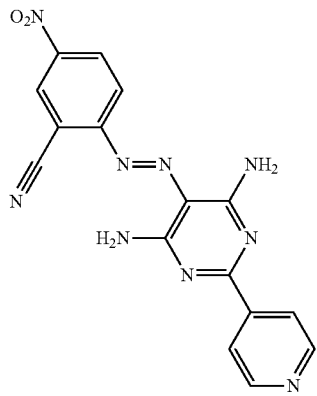 [SMILES: N#Cc1cc([N+](=O)[O-])ccc1/N=N/c1c(N)nc(-c2ccncc2)nc1N] |
| 77 | 474 | 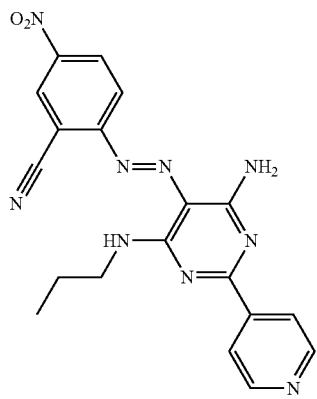 [SMILES: CCCNc1nc(-c2ccncc2)nc(N)c1/N=N/c1ccc([N+](=O)[O-])cc1C#N] |
| 78 | 474 | 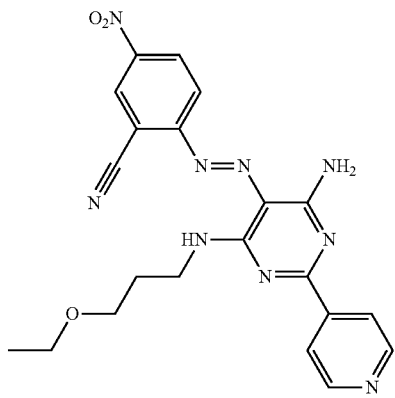 [SMILES: CCOCCCNc1nc(-c2ccncc2)nc(N)c1/N=N/c1ccc([N+](=O)[O-])cc1C#N] |
| 79 | 474 | 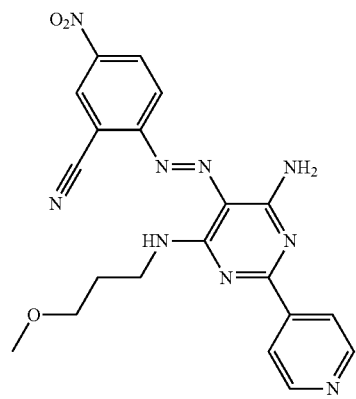 [SMILES: COCCCNc1nc(-c2ccncc2)nc(N)c1/N=N/c1ccc([N+](=O)[O-])cc1C#N] |

-continued
| Preparation Example | λ_max/nm | Dyestuff |
|---|---|---|
| 80 | 422 | 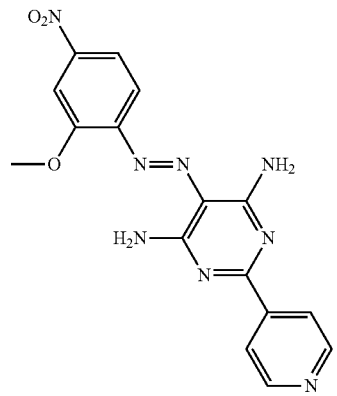 [SMILES: COc1cc([N+](=O)[O-])ccc1/N=N/c1c(N)nc(-c2ccncc2)nc1N] |
| 81 | 464 | 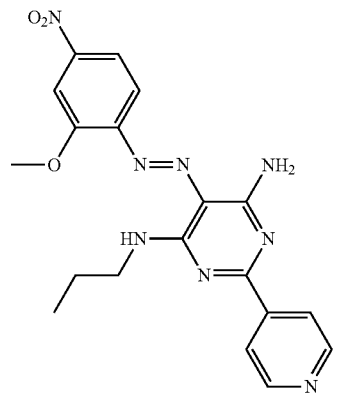 [SMILES: CCCNc1nc(-c2ccncc2)nc(N)c1/N=N/c1ccc([N+](=O)[O-])cc1OC] |
| 82 | 464 | 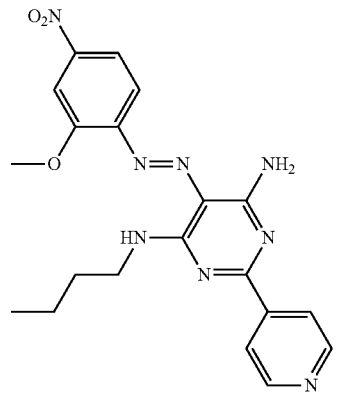 [SMILES: CCCCNc1nc(-c2ccncc2)nc(N)c1/N=N/c1ccc([N+](=O)[O-])cc1OC] |
| 83 | 462 | 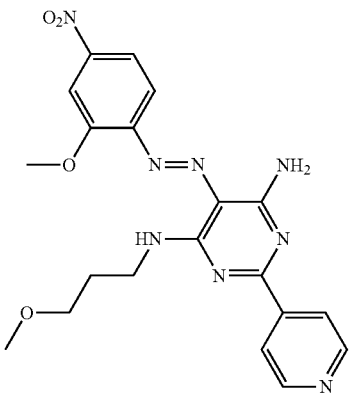 [SMILES: COCCCNc1nc(-c2ccncc2)nc(N)c1/N=N/c1ccc([N+](=O)[O-])cc1OC] |

-continued
| Preparation Example | $\lambda_{max}$/nm | Dyestuff |
|---|---|---|
| 84 | 464 | 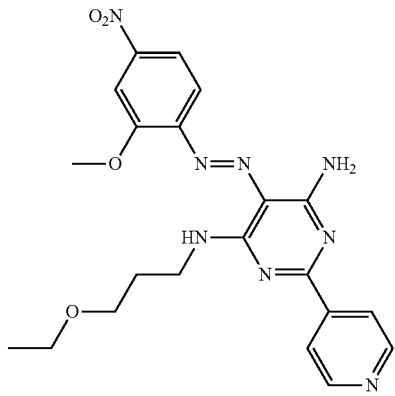 |
| 85 | 486 | 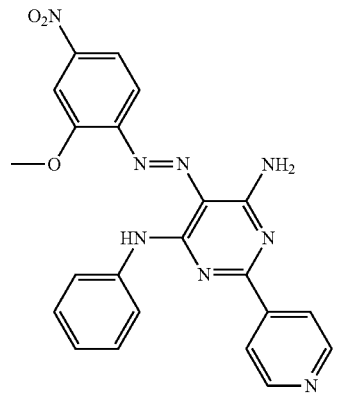 [SMILES: COc1cc([N+](=O)[O-])ccc1/N=N/c1c(N)nc(-c2ccncc2)nc1Nc1ccccc1] |
| 86 | 458 | 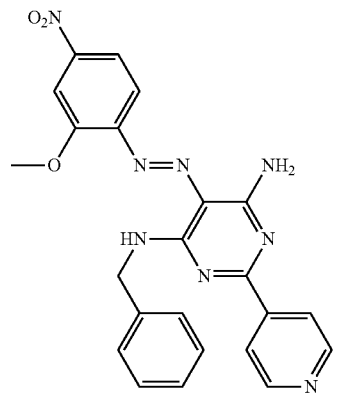 [SMILES: COc1cc([N+](=O)[O-])ccc1/N=N/c1c(N)nc(-c2ccncc2)nc1NCc1ccccc1] |
| 87 | 420 | 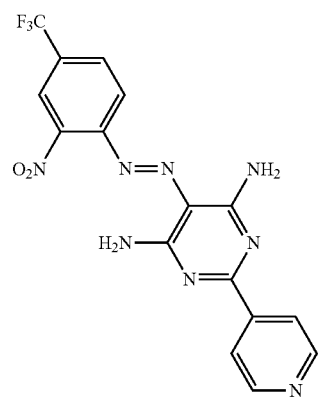 [SMILES: Nc1nc(-c2ccncc2)nc(N)c1/N=N/c1ccc(C(F)(F)F)cc1[N+](=O)[O-]] |

-continued
| Preparation Example | $\lambda_{max}$/nm | Dyestuff |
|---|---|---|
| 88 | 442 | 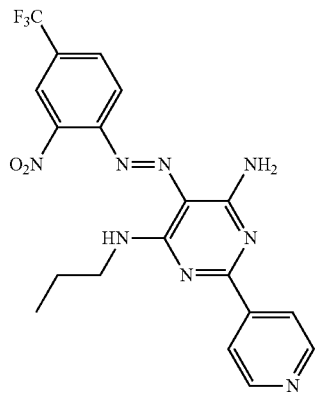 [SMILES: CCCNc1nc(-c2ccncc2)nc(N)c1/N=N/c1ccc(C(F)(F)F)cc1[N+](=O)[O-]] |
| 89 | 444 | 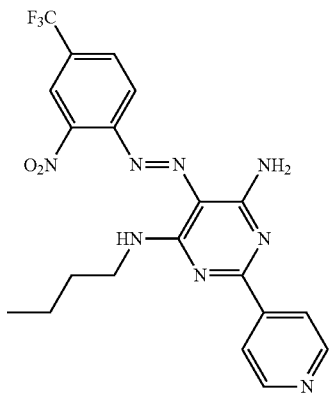 [SMILES: CCCCNc1nc(-c2ccncc2)nc(N)c1/N=N/c1ccc(C(F)(F)F)cc1[N+](=O)[O-]] |
| 90 | 444 | 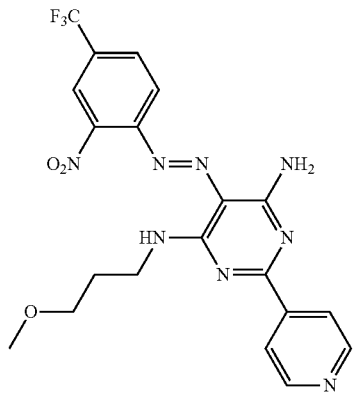 [SMILES: COCCCNc1nc(-c2ccncc2)nc(N)c1/N=N/c1ccc(C(F)(F)F)cc1[N+](=O)[O-]] |
| 91 | 444 | 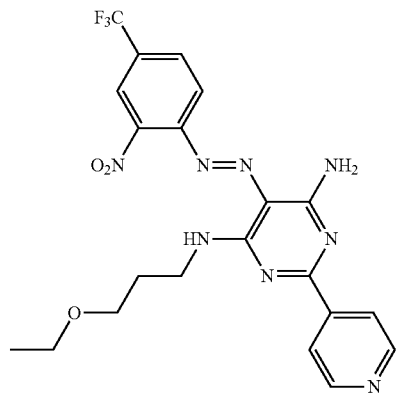 [SMILES: CCOCCCNc1nc(-c2ccncc2)nc(N)c1/N=N/c1ccc(C(F)(F)F)cc1[N+](=O)[O-]] |

-continued
| Preparation Example | $\lambda_{max}$/nm | Dyestuff |
|---|---|---|
| 92 | 458 | 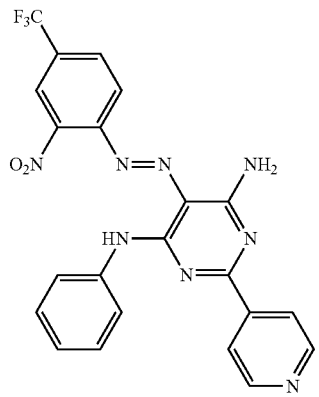 [SMILES: Nc1nc(-c2ccncc2)nc(Nc2ccccc2)c1/N=N/c1ccc(C(F)(F)F)cc1[N+](=O)[O-]] |
| 93 | 442 | 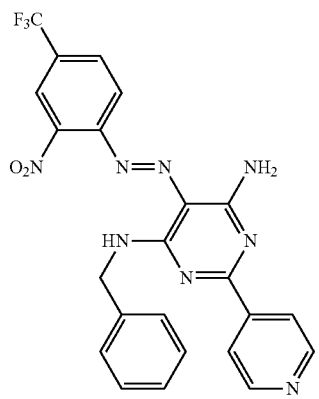 [SMILES: Nc1nc(-c2ccncc2)nc(NCc2ccccc2)c1/N=N/c1ccc(C(F)(F)F)cc1[N+](=O)[O-]] |
| 94 | 418 | 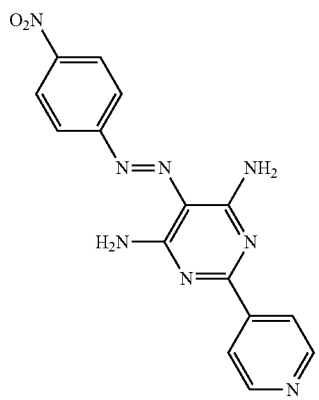 [SMILES: Nc1nc(-c2ccncc2)nc(N)c1/N=N/c1ccc([N+](=O)[O-])cc1] |
| 95 | 444 | 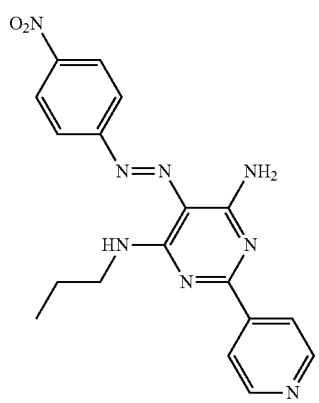 [SMILES: CCCNc1nc(-c2ccncc2)nc(N)c1/N=N/c1ccc([N+](=O)[O-])cc1] |

-continued
| Preparation Example | $\lambda_{max}$/nm | Dyestuff |
|---|---|---|
| 96 | 444 | 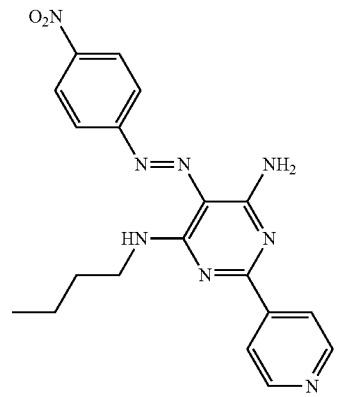 [SMILES: CCCCNc1nc(-c2ccncc2)nc(N)c1/N=N/c1ccc([N+](=O)[O-])cc1] |
| 97 | 442 | 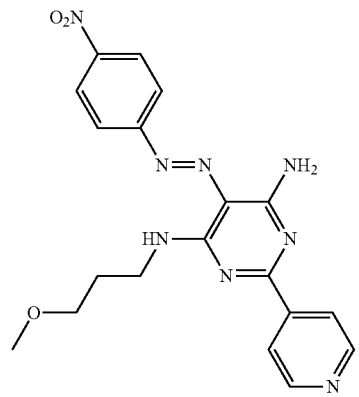 [SMILES: COCCCNc1nc(-c2ccncc2)nc(N)c1/N=N/c1ccc([N+](=O)[O-])cc1] |
| 98 | 442 | 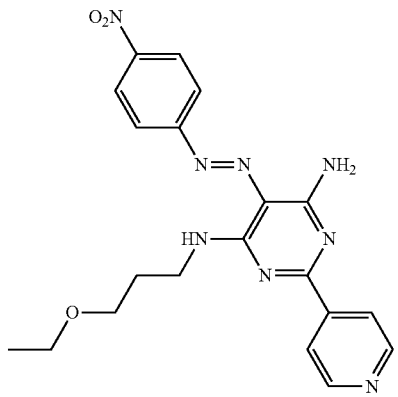 [SMILES: CCOCCCNc1nc(-c2ccncc2)nc(N)c1/N=N/c1ccc([N+](=O)[O-])cc1] |
| 99 | 456 | 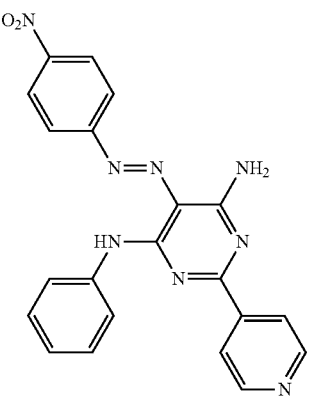 [SMILES: Nc1nc(-c2ccncc2)nc(Nc2ccccc2)c1/N=N/c1ccc([N+](=O)[O-])cc1] |

-continued
| Preparation Example | λ$_{max}$/nm | Dyestuff |
|---|---|---|
| 100 | 438 | 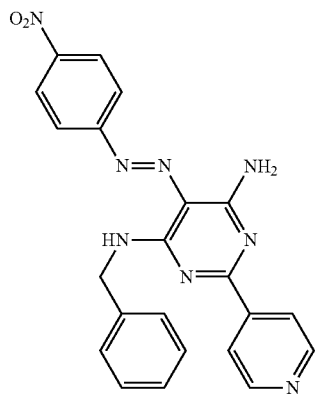 [SMILES: Nc1nc(-c2ccncc2)nc(NCc2ccccc2)c1/N=N/c1ccc([N+](=O)[O-])cc1] |
| 101 | 418 | 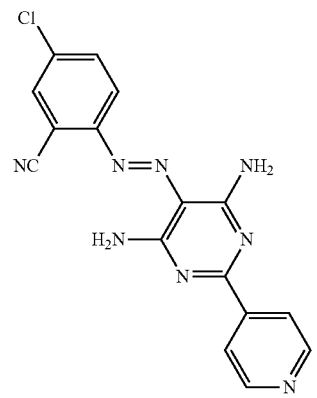 [SMILES: N#Cc1cc(Cl)ccc1/N=N/c1c(N)nc(-c2ccncc2)nc1N] |
| 102 | 436 | 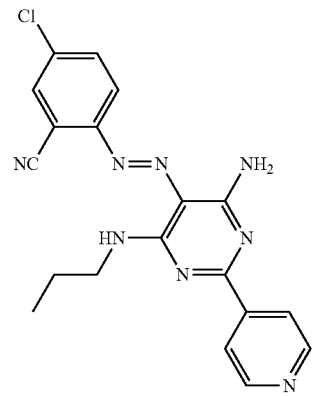 [SMILES: CCCNc1nc(-c2ccncc2)nc(N)c1/N=N/c1ccc(Cl)cc1C#N] |
| 103 | 436 | 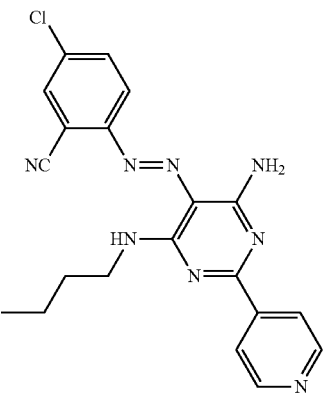 [SMILES: CCCCNc1nc(-c2ccncc2)nc(N)c1/N=N/c1ccc(Cl)cc1C#N] |

-continued
| Preparation Example | λ_max/nm | Dyestuff |
|---|---|---|
| 104 | 436 | 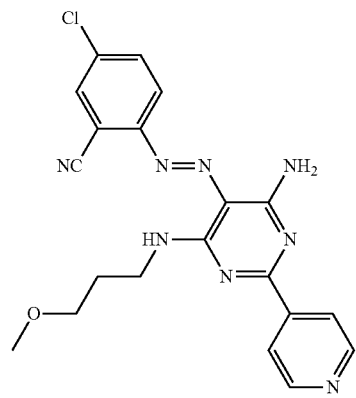 [SMILES: COCCCNc1nc(-c2ccncc2)nc(N)c1/N=N/c1ccc(Cl)cc1C#N] |
| 105 | 436 | 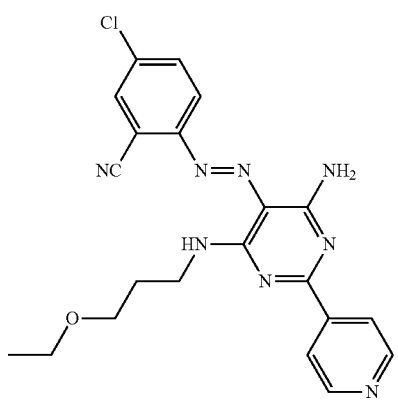 [SMILES: CCOCCCNc1nc(-c2ccncc2)nc(N)c1/N=N/c1ccc(Cl)cc1C#N] |
| 106 | 456 | 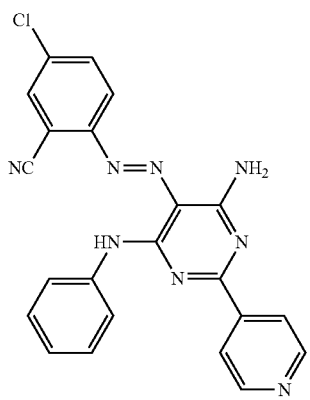 [SMILES: N#Cc1cc(Cl)ccc1/N=N/c1c(N)nc(-c2ccncc2)nc1Nc1ccccc1] |
| 107 | 434 | 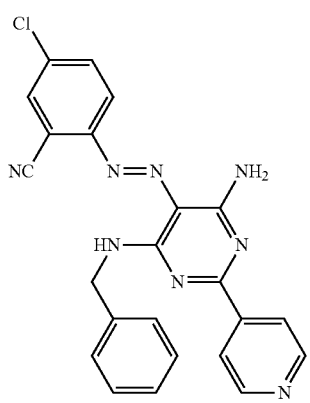 [SMILES: N#Cc1cc(Cl)ccc1/N=N/c1c(N)nc(-c2ccncc2)nc1NCc1ccccc1] |

-continued
| Preparation Example | λ_max/nm | Dyestuff |
|---|---|---|
| 108 | 406 | 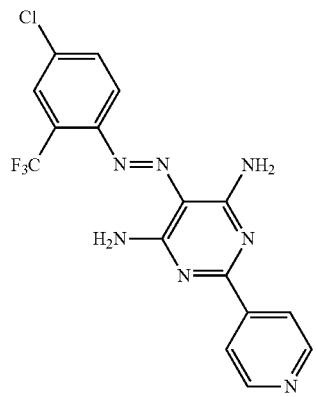 [SMILES: Nc1nc(-c2ccncc2)nc(N)c1/N=N/c1ccc(Cl)cc1C(F)(F)F] |
| 109 | 424 | 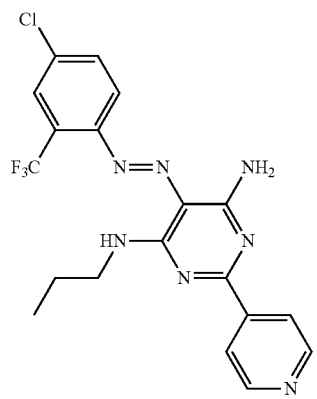 [SMILES: CCCNc1nc(-c2ccncc2)nc(N)c1/N=N/c1ccc(Cl)cc1C(F)(F)F] |
| 110 | 426 | 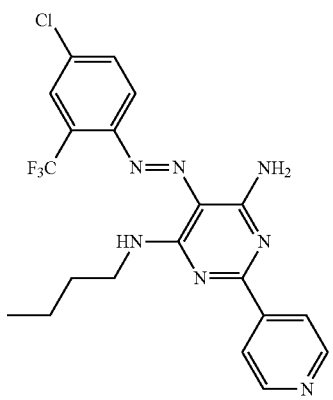 |
| 111 | 424 | 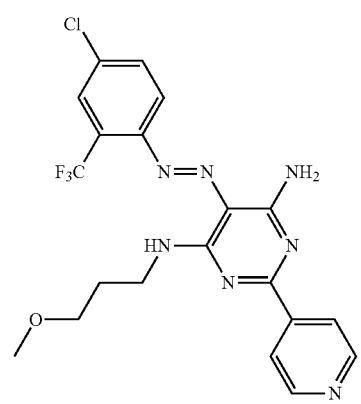 [SMILES: COCCCNc1nc(-c2ccncc2)nc(N)c1/N=N/c1ccc(Cl)cc1C(F)(F)F] |

| Preparation Example | $\lambda_{max}$/nm | Dyestuff |
|---|---|---|
| 112 | 426 | 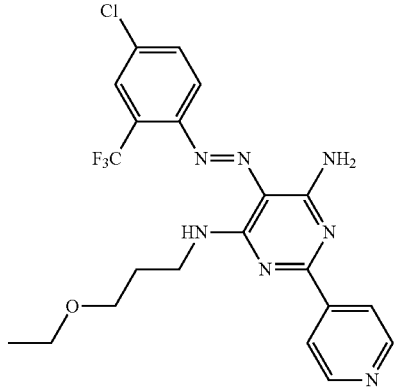 |
| 113 | 438 | 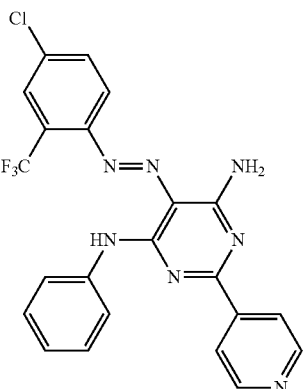 |
| 114 | 426 | 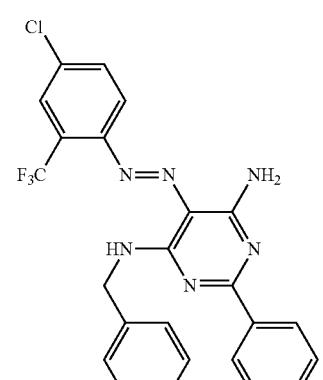 |

II. APPLICATION EXAMPLES

Application Example 1

1 part by weight of the dye of formula (101) according to Preparation Example 1 is milled together with four parts of a commercially available dispersing agent and 15 parts of water.

Using this formulation, a 1% dyeing (based on the dye and the substrate) is produced on woven polyester by high temperature exhaust process at 135° C.

Test results: the light fastness of the dyeing is excellent as well as the results in the VDA 75202 5 cycles and SAE J2412 488 kJ tests. The build-up properties of the dye are very good.

Application Examples 2 to 114

Application Example 1 is repeated by using the dyes of Preparation Examples 2 to 114 instead of the dye of formula (101) according to Preparation Example 1. The build-up properties of the dyes are very good and the dyeings exhibit good light fastness and very good results in the VDA 75202 5 cycles and SAE J2412 488 kJ tests.

COMPARATIVE EXAMPLES

Application Example 1 is repeated by using a dye disclosed in GB 1418742. The dyes disclosed in GB 1418742 are corresponding to substituted diamino pyrimidine disperse azo dyes but GB 1418742 fails to disclose diamino pyrimidine disperse azo dyes substituted with a nitrogen containing heterocyclic aromatic ring. Examples of dyes disclosed in GB 1418742 and used in this Comparative Example 1 and Comparative Example 2 are according to following structure:

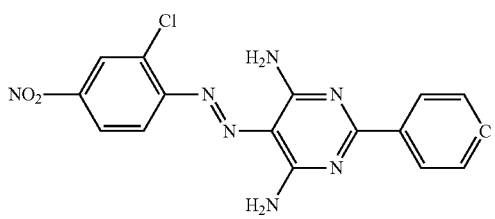

Comparative Example 1

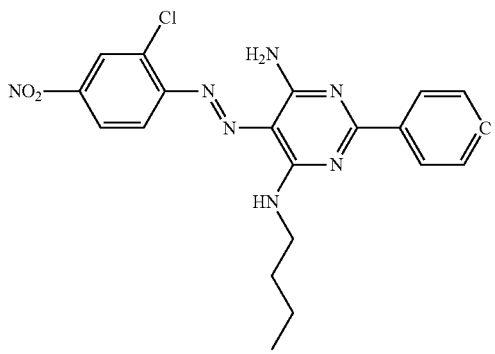 [SMILES: CCCCNc1nc(-c2ccccc2)nc(N)c1/N=N/c1ccc([N+](=O)[O-])cc1Cl]

Comparative Example 2

The light fastness and colour change after heat-light exposure obtained using the dye according to GB 1418742 was compared to the light fastness obtained using the dye according to Application Example 22 and Application Example 24:

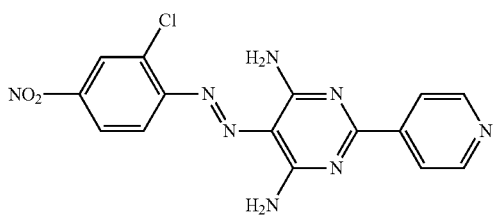 [SMILES: Nc1nc(-c2ccncc2)nc(N)c1/N=N/c1ccc([N+](=O)[O-])cc1Cl]

Application Example 22

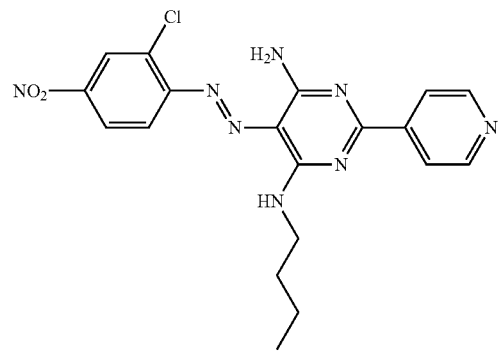 [SMILES: CCCCNc1nc(-c2ccncc2)nc(N)c1/N=N/c1ccc([N+](=O)[O-])cc1Cl]

Application Example 24

The results obtained according to the SAE J2412 488 kJ standard are summarized below:

|  | Build Up (RD) | Colour strength After exposure (%) | colour change After exposure $dE_{ab*}$ |
|---|---|---|---|
| Comparative example 1 | 0.25 | 74 | 6.33 |
| Application example 22 | 0.25 | 77 | 4.92 |
| Comparative example 2 | 0.25 | 61 | 10.66 |
| Application example 24 | 0.25 | 69 | 8.42 |

The loss of colour strength after heat-light exposure according to the SAE J2412 488 kJ test using the dye according to the invention (corresponding to preparation example 22) is slightly better compared to the loss of colour strength using the dye according to GB 1418742.

The colour change ($dE_{ab*}$ or dE* in short form) is calculated according the following formula:

$$dE_{ab}^* = ((dL^*)^2 + (da^*)^2 + (db^*)^2)^{1/2}$$

Wherein a*, b*=colour coordinates da*, db*=difference of the colour coordinates

L*=lightness dL*=change of the lightness

The colour change after heat-light exposure according to the SAE J2412 488 kJ test using the dye according to the invention (corresponding to preparation example 22) is significantly better compared to the colour change using the dye according to GB 1418742. This surprising result is due to the presence of the substituted nitrogen containing heterocyclic aromatic ring in the dye according to the invention.

What is claimed is:

1. An azo dye of formula

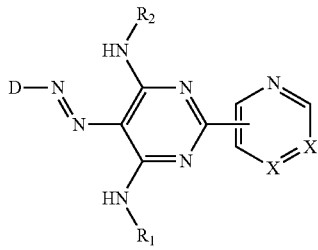
(1)

wherein
D is a radical of formula

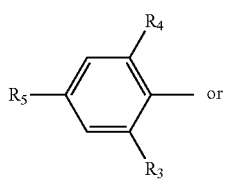
(2)

or

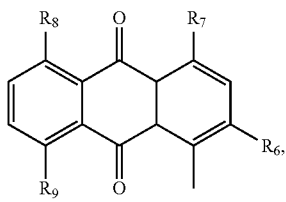
(3)

$R_1$ and $R_2$ independently denote hydrogen; $C_6$-$C_{10}$ aryl which is unsubstituted or substituted by cyano, carboxy, hydroxy, halogen, $C_1$-$C_6$alkyl, or $C_1$-$C_6$alkoxy; $C_1$-$C_{12}$alkyl which may be interrupted one or more times by —O—, —S—, —$NR_4$—, —CO—, —COO— or —OOC—, and is unsubstituted or substituted by cyano, carboxy, hydroxy, $C_6$-$C_{10}$ aryl, or $C_6$-$C_{10}$ aryloxy, which $C_6$-$C_{10}$ aryl or $C_6$-$C_{10}$ aryloxy is unsubstituted or substituted by cyano, carboxy, hydroxy, halogen, $C_1$-$C_6$ alkyl, or $C_1$-$C_6$ alkoxy;

$R_3$ and $R_4$ are each independently of the other hydrogen, halogen, nitro, cyano, trifluoromethyl, carboxy, $C_1$-$C_6$ alkyl, $C_1$-$C_6$ alkoxy, $C_1$-$C_6$ alkylcarbonyl, $C_6$-$C_{10}$ arylcarbonyl, $C_1$-$C_6$ alkoxycarbonyl, $C_1$-$C_6$ alkylsulfonyl, $C_1$-$C_6$ alkylsulfonylamino or $C_1$-$C_4$ alkanoylamino, and $R_5$ is halogen, nitro, cyano, trifluoromethyl, carboxy, $C_1$-$C_6$ alkyl, $C_1$-$C_6$ alkoxy, $C_1$-$C_6$ alkylcarbonyl, $C_6$-$C_{10}$ arylcarbonyl, $C_1$-$C_6$ alkoxycarbonyl, $C_1$-$C_6$ alkylsulfonyl, $C_1$-$C_6$ alkylsulfonylamino or $C_1$-$C_4$ alkanoylamino; and $R_6$, $R_7$, $R_8$ and $R_9$ independently of each other are hydrogen, hydroxy, halogen, cyano, nitro or $C_1$-$C_4$ alkanoylamino, and the radicals X independently denote N or C—H, with the proviso that at least one radical X denotes C—H.

2. An azo dye of formula (1) according to claim 1, wherein $R_1$ and $R_2$ independently denote hydrogen, methyl, ethyl, n-propyl, i-propyl or n-butyl, 2-methoxyethyl, 3-methoxypropyl, 4-methoxybutyl, 2-ethoxyethyl, 3-ethoxypropyl, 4-ethoxybutyl, phenyl, tolyl, benzyl, or 2-phenylethyl.

3. An azo dye of formula (1) according to claim 1, wherein $R_1$ is hydrogen and $R_2$ denotes hydrogen, methyl, ethyl, n-propyl, i-propy n-butyl, 2-methoxyethyl, 3-methoxypropyl, 4-methoxybutyl, 2-ethoxyethyl, 3-ethoxypropyl, 4-ethoxybutyl, phenyl, tolyl, benzyl, or 2-phenylethyl.

4. An azo dye of formula (1) according to claim 1, wherein $R_1$ and $R_2$ are hydrogen.

5. An azo dye of formula (1) according to claim 1, wherein both radicals X denote C—H.

6. An azo dye of formula (1) according to claim 1, wherein $R_3$ and $R_4$ are each independently of the other hydrogen, halogen, nitro, cyano, trifluoromethyl, methylsulfonyl, ethylsulfonyl, acetylamino, or propionylamino and wherein $R_5$ is halogen, nitro, cyano, trifluoromethyl, methylsulfonyl, ethylsulfonyl, acetylamino, or propionylamino.

7. An azo dye of formula (1) according to claim 6, wherein $R_3$ and $R_4$ are each independently of the other hydrogen, halogen, nitro, cyano, or trifluoromethyl and wherein $R_5$ is halogen, nitro, cyano, or trifluoromethyl.

8. An azo dye of formula (1) according claim 1, wherein $R_6$, $R_7$, $R_8$ and $R_9$ independently of each other are hydrogen, hydroxy, halogen, acetylamino, or propionylamino.

9. An azo dye of formula (1) according to claim 1, wherein D is a radical of formula (2).

10. A process for the preparation of an azo dye of formula (1) according to claim 1, which comprises diazotizing an amine compound of formula

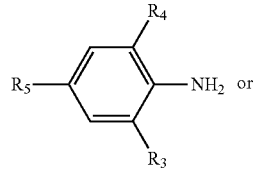
(2a)

or

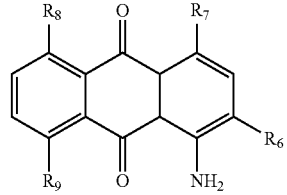
(3a)

to form a diazotized amine and then coupling the diazotized amine to a coupling component of the formula

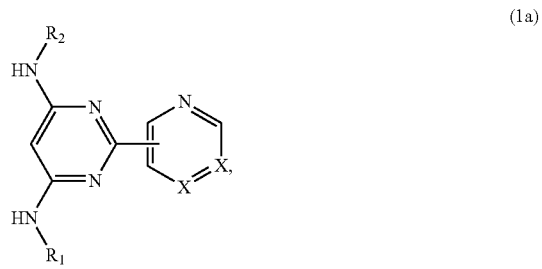
(1a)

wherein $R_1$, $R_2$, $R_3$, $R_4$, $R_5$, $R_6$, $R_7$, $R_8$, $R_9$ and X are as defined in claim 1.

11. A process for dyeing semi-synthetic or synthetic hydrophobic fibre materials comprising applying an aqueous composition comprising a dye of formula (1) according to claim 1 to the semi-synthetic or synthetic hydrophobic fibre materials.

12. A semi-synthetic or synthetic hydrophobic fibre material, dyed by the process according to claim 11.

13. A process for printing semi-synthetic or synthetic fibre materials comprising spraying an aqueous composition comprising a dye of formula (1) according to claim 1 onto the semi-synthetic or synthetic hydrophobic fibre materials.

14. A semi-synthetic or synthetic hydrophobic fibre material printed by the process according to claim 13.

\* \* \* \* \*